United States Patent
Keyaki et al.

(10) Patent No.: US 7,652,579 B2
(45) Date of Patent: Jan. 26, 2010

(54) ARTICLE WITH WIRELESS IC TAG

(75) Inventors: Keiichi Keyaki, Toyama-ken (JP);
Tomonari Sugata, Toyama-ken (JP);
Takashi Nagayasu, Toyama-ken (JP);
Tatsuya Deto, Jakarta (ID); Norihiro Kawamura, Toyama-ken (JP)

(73) Assignee: YKK Corporation, Tokyo (JP)

( * ) Notice: Subject to any disclaimer, the term of this patent is extended or adjusted under 35 U.S.C. 154(b) by 266 days.

(21) Appl. No.: 11/587,289

(22) PCT Filed: Jul. 8, 2004

(86) PCT No.: PCT/JP2004/009740

§ 371 (c)(1),
(2), (4) Date: Oct. 19, 2006

(87) PCT Pub. No.: WO2006/006211

PCT Pub. Date: Jan. 19, 2006

(65) Prior Publication Data

US 2007/0222601 A1    Sep. 27, 2007

(51) Int. Cl.
*G08B 13/14* (2006.01)
(52) U.S. Cl. .............. 340/572.8; 340/572.1; 340/572.6; 340/568.2; 340/572.9; 156/293; 235/486
(58) Field of Classification Search .............. 340/572.8, 340/572.6, 572.7, 572.9, 572.1, 573.4, 425.5, 340/568.2, 568.1; 257/E21.503; 438/14; 156/275.5, 293, 292; 343/700 MS; 235/451, 235/486, 492
See application file for complete search history.

(56) References Cited

U.S. PATENT DOCUMENTS 7,015,815 B1 * 3/2006 Feibelman .............. 340/572.8

2002/0190131 A1 * 12/2002 Droz .................. 235/492
2006/0131422 A1 * 6/2006 Sesne ................. 235/486

FOREIGN PATENT DOCUMENTS

DE    197 33 596 A1    2/1999
DE    197 332 592 A1    2/1999

(Continued)

OTHER PUBLICATIONS

European Search Report for EP Application No. 04 74 7208, dated Sep. 12, 2008.

*Primary Examiner*—Benjamin C Lee
*Assistant Examiner*—Sisay Yacob
(74) *Attorney, Agent, or Firm*—Alston & Bird LLP

(57) ABSTRACT

A wireless IC tag mounted on a low magnetic permeability material is mounted on a holding part which has first and second surfaces and is made of a high magnetic permeability material. The holding part has a penetrating part which penetrates the first and second surfaces, and a notch which penetrates a part of the first and second surfaces at a periphery. A discontinuous region is formed on the holding part due to the notch, and at least on the penetrating part, the wireless IC tag is tightly held together with the low magnetic permeability material. An axis of reverse direction magnetic flux generated by an eddy current that flows in the periphery of the penetrating part and the notch is shifted from an axis of the magnetic flux produced by electromagnetic waves directed toward the wireless IC tag on the first and second surfaces.

13 Claims, 29 Drawing Sheets

FOREIGN PATENT DOCUMENTS

| | | |
|---|---|---|
| EP | 1 237 288 A2 | 9/2002 |
| EP | 1 308 883 A1 | 5/2003 |
| JP | 2002-42100 | 2/2002 |
| JP | 2002-125721 | 5/2002 |
| JP | 2003-004444 A | 1/2003 |
| JP | 2003-6599 | 1/2003 |
| JP | 2003-36431 | 2/2003 |
| JP | 2003-85515 | 3/2003 |
| JP | 2003-519424 | 6/2003 |
| JP | 2004-127057 | 4/2004 |
| WO | WO 93/22907 | 11/1993 |

\* cited by examiner

ARTICLE WITH WIRELESS IC TAG

TECHNICAL FIELD

The present invention relates to a variety of articles with a wireless IC tag, and for example e, fastening articles containing metal such as a slide fastener, a surface fastener, a snap fastener with tape, a rail-like fastener with engaging rows, a buckle, a cord stopper, a belt adjuster, a swivel, and a snap button; miscellaneous daily goods such as clothes and bags with those fastening articles; and various high class articles such as watches and bags.

BACKGROUND ART

In recent years, a so-called passive type, small and inexpensive wireless IC tag having no fear that a battery is exhausted has been attached to a product at a manufacturing stage in order to execute total management of a product from manufacturing to distribution, sale and the like of the product, and to prevent the product from being lost, stolen or forged.

The passive type wireless IC tag (hereinafter, referred to as just RFID) is constituted of an IC chip, coil-like or spiral-like antenna, and a coil jumper which connects both. The IC chip has a variety of necessary data stored therein, and many types of the IC chips allow new data to be written and erased and then read from outside. A starter power source of this passive type RFID is an electromagnetic induction type (or micro wave type) RFID which has no own power source but use an electromotive force generated from electromagnetic waves (or microwaves) received from an external reader/writer (or scanner) as its power source.

Therefore, the electromagnetic wave emitted from the reader/writer (or scanner) is used not only as a carrier for transmitting data but also for an electromotive force for the passive type RFID. The carrier is modulated to a wavelength meeting the passive type RFID within the reader/writer (scanner) and received by a receiving antenna of the same RFID so as to fetch out necessary data stored in a memory of the IC chip and then, the same data is modulated to a wavelength corresponding to the reader/writer (or scanner) and transmitted from a built-in antenna as response data. Alternatively, unnecessary data out of the data stored in the memory of the IC chip can be erased according to an instruction from the reader/writer (or scanner).

A signal transmitted in response is received by the receiving antenna of the reader/writer (or scanner), and the response data is analyzed by a control unit of the reader/writer (or scanner). The response data is stored temporarily in the reader/writer (or scanner) as data stored in the passive type RFID, and then transmitted to a control device such as a personal computer. Data is read out from the memory of the passive type RFID, and a variety of security means are taken upon writing of data.

Specific examples in which this kind of passive type RFID is incorporated in a fastening product include, for example, "Pull tab of slider fastener" described in Japanese Patent Application Laid-Open No. 2002-125721 (patent document 1) and "Clothes button with leg to be sewed on" described in Japanese Patent Application Laid-Open No. 2002-42100 (patent document 2).

According to a metallic pull tab of a slide fastener described in the patent document 1, a passive type RFID IC chip sealed in a narrow glass tube and a coil antenna are embedded in a main body of the metallic pull tab. For this embedding, an embedding hole for the glass tube is formed in the main body of the pull tab, and a transmission/reception slit which extends in a longitudinal direction of the glass tube and communicates inside with outside is formed in a wall face of the embedding hole. A coil antenna is exposed at a portion of the transmission/reception slit, so that signals can be exchanged with a reader/writer (or scanner) disposed outside. After the glass tube having the passive type RFID sealed therein is inserted into the embedding hole, an opening end of the embedding hole is sealed with epoxy resin to prevent the passive type RFID from falling down.

On the other hand, the clothes button with leg to be sewed on described in the patent document 2 is constituted of a button main body having magnetic permeability and a passive type RFID mounting body. A circular recess is formed on a surface of the button main body, and a leg to be sewed on clothes is provided protrudedly and integrally on a rear face of the button main body.

The passive type RFID is integrally fixed to a center of the recess so as to be covered with epoxy resin which is a low magnetic permeability material. As to the passive type RFID, an IC chip and a coil antenna wound spirally so as to surround the IC chip are disposed in the recess. After the passive type RFID is disposed within the recess, epoxy resin is poured into the recess and left to harden to carry out sealing waterproof treatment.

Patent document 1: Japanese Patent Application Laid-Open No. 2002-125721

Patent document 2: Japanese Patent Application Laid-Open No. 2002-42100

DISCLOSURE OF THE INVENTION

Problem to be Solved by the Invention

When a magnetic flux produced by electromagnetic waves emitted from the reader/writer passes through the coil antenna in the passive type RFID, an induced electromotive force is generated due to electromagnetic induction in the coil antenna, and its electric power is used as a power source of the RFID. At this time, if a high magnetic permeability material such as metal is disposed around the RFID and the magnetic flux passes through the high permeability material, an eddy current is generated in the high magnetic permeability material to eliminate the magnetic flux. As a result, the magnetic flux is dampened, and consequently, the induced electromotive force is weakened.

This is fatal to the passive type RFID embedded in a metallic product. For example, in the pull tab of the slide fastener described in the patent document 1, the passive type RFID sealed in the narrow glass tube is embedded in the embedding hole in the metallic pull tab and sealed with epoxy resin. In this case also, an eddy current is generated in the metal located around the glass tube as described previously in order to eliminate the magnetic flux produced by electromagnetic waves emitted from the reader/writer, so that an induced electromotive force generated in the coil antenna is reduced largely. According to this patent document 1, the embedding hole is a blind bottomed hole having a bottom surface. Although a slit communicating inside with outside is formed in an inner wall face of the embedding hole, the slit is just a transmission/reception slit as described in the document 1. This can be understood from a fact that, in a tab made of a leather etc., a metal tube is disposed around the glass tube, and an elongated hole for transmission/reception is formed in the metal tube. As a result, at a periphery of the embedding hole, in particular, a metal portion of a bottom of the hole in a metallic pull tab, an eddy current to eliminate the magnetic flux produced by electromagnetic waves emitted from the reader/writer is generated to largely reduce the induced electromotive force which serves for a power source of the RFID.

On the other hand, the patent document 2 has disclosed a button in which an IC chip is disposed in a center thereof, a spiral antenna is disposed around the IC chip to constitute a passive type RFID, and this is sealed by hardening epoxy resin and at a same time integrally fixed to a circular recess in the button main body. To make this button communicate with an external reader/writer (or scanner), electromagnetic waves emitted from the reader/writer are directed to the center of the button. The embodiment of the document 2 produces no problem because the button main body is also made of a synthetic resin material which is a low magnetic permeability material. However, if the button main body is made of metal, an eddy current is generated in the metal portion in a direction of eliminating the magnetic flux produced by the electromagnetic waves emitted from the reader/writer as described above, and the passive type RFID cannot be activated.

If the passive type RFID is attached to a metal product, the prior art has made efforts not to give the above-described influence by the metal product upon the coil-like antenna of the passive type RFID. To block this influence, a distance between the metal product and the passive type RFID needs to be increased, or various other measures such as arranging a shielding material between the metal product and the passive type RFID are necessary. However, such a measure eliminates meaning of adopting the small and inexpensive passive type RFID, and if a product itself is small, realization of the product becomes impossible.

It is considered that the eddy current is generated not only in the above-described passive type RFID but also in an active type RFID having a starter battery. The eddy current is generated to eliminate the magnetic flux produced by electromagnetic waves emitted from the reader/writer. By dampening the electromagnetic waves, communication is sometimes disabled. Therefore, in this specification, the RFID includes both the passive type and active type.

The present invention has been achieved to solve the above-described conventional problem, and a specific object of the invention is to provide an article with RFID deprived of influences of reduction of an electromotive force of the RFID due to a high permeability material on which the RFID is attached, particularly, a metallic material, with a simple countermeasure.

Means for Solving the Problem

Such an object is achieved by an article with an RFID, including a holding part which has first and second surfaces and is made of a high magnetic permeability material, the holding part holding the RFID sealed therein with a low magnetic permeability material, wherein the holding part has a penetrating part which penetrates the first and second surfaces, a notch which penetrates a part of the continuous first and second surfaces in a periphery of the penetrating part and makes the penetrating part communicate with outside is provided, a discontinuous region is formed on the holding part in the periphery of the penetrating part due to the notch, and at least on the penetrating part, the RFID is tightly held together with the low magnetic permeability material.

According to the present invention, an eddy current for eliminating the magnetic flux produced by electromagnetic waves emitted from, particularly, a reader/writer flows in the periphery of the penetrating part and the notch to deflect a center of the eddy current at a position apart from the wireless IC tag held in the penetrating part. The wireless IC tag is accommodated in an accommodating member composed of a low magnetic permeability material, the accommodating portion is comprised of a first accommodating member and a second accommodating member, and the first accommodating member and the second accommodating member sandwich the wireless IC tag.

Typically, the RFID molded sealingly with the low magnetic permeability material is mounted on a fastening article, and the fastening article is a slide fastener and the holding part of the RFID is a slider or a pull tab of the slide fastener. Specifically, the slider has an upper plate, a lower plate and a connecting post for connecting the upper plate and the lower plate, and the penetrating part and the notch are preferably provided in an edge of the lower plate. A configuration is allowed in which the slider has a pull tab and a pull tab attaching post for attaching the pull tab, the pull tab attaching post is constituted of a front post and a rear post separated to a front portion and a rear portion with respect to the slider, and the penetrating part and the notch are provided between opposing end faces of the front post and the rear post.

Further, the fastening product is a slide fastener, and the holding part of the RFID is a pull tab of the slide fastener. Alternatively, the fastening product is a button, and the holding part of the RFID is a main body of the button, or an eyelet of the button. Specifically, the button has a circular base part and a covering member fixed integrally to the peripheral part of the base part, and preferably, the penetrating part and the notch are provided in a peripheral part of the base part. The RFID IC chip is preferred to have data for discriminating the real from the false and/or data for physical distribution management.

In addition to the configuration described above, preferably, there is provided, in the holding part made of a high magnetic permeability material, a shielding member attaching part to which a shielding member made of a high magnetic permeability material for shielding the penetrating part to interrupt communication is mounted detachably on a transmitting/receiving face with respect to an external reader/writer. The above-described object is achieved by an article with a RFID, including a holding part made of a high magnetic permeability material, the holding part holding the RFID sealed therein with a low magnetic permeability material, wherein an electromagnetic shielding member is interposed between the holding part and the RFID.

Operation and Effect

If a passive type RFID molded sealingly with a low magnetic permeability material, for example, epoxy resin is embedded in and fixed to a holding part which has first and second surfaces and is made of a high magnetic permeability material, for example, a metallic plate, usually as described previously, a magnetic flux produced by electromagnetic waves emitted from a reader/writer passes through a coil antenna in the RFID, so that an induced electromotive force is generated in the coil antenna by electromagnetic induction and its electric force is used as a power source of the RFID. If a high magnetic permeability material such as metal is disposed around the RFID and the magnetic flux passes through the high magnetic permeability material, an eddy current for eliminating the magnetic flux is generated in the high magnetic permeability material. As a result, the magnetic flux is dampened to reduce the induced electromotive force.

As a result of executing various experiments to block generation of the eddy current by inventors of the present invention, a penetrating part is formed in the holding part of the high magnetic permeability material for holding the RFID, and a notch which makes the penetrating part communicate with outside and penetrates the first and second surfaces is formed. Then, a notch communicating inside with outside and penetrating the first and second surfaces is formed in part of the high magnetic permeability material existing continuously in a periphery with a center of the antenna of the RFID mounted in the penetrating part used as a central axis, thereby forming a discontinuous region of the high magnetic permeability material in the periphery of the penetrating part.

The discontinuous region is formed with the notch in the high magnetic permeability material, the RFID sealed with the low magnetic permeability material is fixed in the penetrating part, and electromagnetic waves from the reader/writer are transmitted. As a result, it has been known that smooth and sufficient transmission/reception is enabled with respect to a reader/writer although the high magnetic permeability material exists around the RFID except a part. Here, the RFID is accommodated in an accommodating member molded with a low magnetic permeability material and sealed. This accommodating member is constituted of first and second major members each having an accommodating concave portion, and the RFID is integrally fitted to the accommodating concave portion and sealed. This is carried out for preventing water from attaching to the RFID or the RFID from being exposed to high temperature environments when the RFID has been embedded by molding with the low magnetic permeability material. Unless the notch is formed, naturally, transmission/reception is disabled.

Confirmation has been made on changes in a magnetic field between when the notch is formed and when no notch is formed, and a direction and location of a current flowing on a surface of the high magnetic permeability material through an analysis. As a result, an eddy current flowing in a direction of a rotation around the penetrating part is generated on the surface of the high magnetic permeability material when no notch is formed. However, it has been confirmed that as a result of forming the notch, the eddy current is not generated in the periphery of the penetrating part but it flows in a single direction bypassing the penetrating part and the notch along a periphery of an U-shaped high magnetic permeability material including the penetrating part and the notch. That is, it has been confirmed that by forming the notch, the center of the eddy current is moved from the center of the penetrating part to the surface of the high magnetic permeability material. As a result, a magnetic flux due to the eddy current moves from the penetrating part to the high magnetic permeability material, thereby making it evident that the magnetic flux produced by electromagnetic waves emitted to the penetrating part from a reader/writer functions effectively.

If the RFID is mounted on a slider or pull tab of a slide fastener, or a metallic button main body or its eyelet as a preferred embodiment of the fastening article, smooth data communication with a reader/writer or scanner is enabled, so that discriminating the real from the false or product management can be carried out directly or through a computer. To achieve this discrimination of the real from the false or the product management, data for discriminating the real from the false and/or data for the physical distribution management needs to be stored in the IC chip of the RFID.

However, if the data for discriminating the real from the false and/or the data for physical distribution management is stored, those data may be analyzed in relation with a final purchaser after the distribution stage, so that a problem about privacy is included. Thus, in addition to the above-described configuration, it is preferable to provide the holding part made of the high magnetic permeability material with a shielding member attaching portion for detachably attaching a shielding member made of a high magnetic permeability material which shields the penetrating part on a transmitting/receiving face with respect to an external reader/writer or scanner. In this case, preferably, the shielding member is undetachably mounted to the shielding member mounting portion depending on an intention of a purchaser when a product is transferred to a final purchaser.

When mounting the RFID which has the holding part made of the high magnetic permeability material and is molded sealingly with a low magnetic permeability material, an electromagnetic shielding member absorbs the electromagnetic waves emitted from the reader/writer even if the electromagnetic shielding member is interposed between the holding part and the RFID, thereby blocking an eddy current from being generated in the holding part made of the high magnetic permeability material.

BEST MODE FOR CARRYING OUT THE INVENTION

Preferred embodiments of the present invention will be described specifically with reference to the accompanying drawings. Although an electromagnetic induction type passive type RFID will be exemplified in the following description, the RFID of the present invention includes not only the electromagnetic induction type but also an RFID responding to microwaves and an active type RFID. Mainly, fastening articles and products equipped with the same articles can be mentioned as an article of the present invention. However, the article of the invention is not restricted to the fastening articles but includes a variety of brand articles such as watches and belts.

The fastening articles include a slide fastener, a surface fastener, a snap fastener, a rail fastener, a buckle, a cord stopper, a belt adjuster, a swivel, a snap button, a button and the like. Examples of the article which can be equipped with the fastening article include a bag, sport wear, various kinds of clothes, bags, shoes and the like.

According to a typical aspect of the passive type RFID applied to the present invention, a responding circuit is constituted by electrically connecting an IC chip having a memory for storing data such as identification information of an identification object with an antenna wound spirally around the IC chip disposed at an eccentric position. As the responding circuit, for example, a detection circuit, a power source circuit, a control circuit, a memory circuit, a modulation circuit, an oscillation circuit or the like is incorporated. A communication distance of the RFID is 0 to less than 10 cm, preferably less than 10 mm. The present invention may be a contact type IC chip which enables communication when the IC chip makes contact with a reader/writer.

Next, typical embodiments of the present invention will be described in detail.

FIRST EMBODIMENT

FIGS. 1 and 2 show a half portion of a test piece 100, 200 according to a first embodiment of the present invention and a comparative example, respectively. In the both test pieces 100, 200, as understood from these figures, a rectangular blind hole 101, 201 is formed in a center of an end face of a metal piece composed of a thick rectangular solid. Of upper and lower wall portions 102, 103; 202, 203 opposing each other at upper and lower positions in these figures, the lower wall portions 103, 203 each are used as a holding part of a passive type RFID. In a center of the holding part, a penetrating hole 104, 204 is formed for holding a passive type RFID (not shown) in which a circularly wound spiral type antenna and an IC chip are possessed and integrally sealed in a form of a disk.

In the test piece 100 used for the first embodiment of the present invention shown in FIG. 1, a notch portion 105 communicating inside with outside is formed in part of the lower wall portion 103 on a side of an opening of the rectangular solid shaped blind hole 101, so that a metal portion around the penetrating hole 104 is divided by the notch portion 105 and a discontinuous region R is formed in the metal portion. In the comparative example shown in FIG. 2, on the other hand, the above-described notch portion is not formed, a metal portion continuously exists around the penetrating hole 204, and no discontinuous region R exists unlike the present embodiment. In the meantime, symbol A shown in FIGS. 1 and 2 indicates a center position of a disk-like passive type RFID (not shown) when held by the penetrating hole 104, 204.

For the embodiment and comparative example, an electromagnetic induction type (13.56 MHz) passive type RFID (manufactured by HITACHI MAXELL) was used. Further, according to this embodiment, test pieces of 0.3 mm, 0.5 mm, 0.8 mm and 2.0 mm in a right-left width of the notch portion 105 were prepared. A reading test with a pen-shaped reader/writer was carried out about these test pieces and a test piece of the comparative example provided with no notch portion. As a result, although the test piece of the comparative example is disabled from being read, all the test pieces of the present embodiment is enabled to be read regardless of a size of the right-left width of the notch portion 105.

Then, the present inventors carried out a simulation test on an eddy current I (vector) around the penetrating holes 104, 204 in the lower wall portions 103, 203 for the present embodiment and comparative example. FIG. 3 shows a location and direction of a current substantially flowing through the penetrating hole 104 in the lower wall portion 103 and the metal portion around the notch portion 105 of the test piece according to this embodiment. FIG. 4 shows a location and direction of a current substantially flowing over an X-Y two-axis plane (wall face), the current being generated in the metal portion around the penetrating hole 104 in the lower wall portion 203 of the test piece according to the comparative example. In the meantime, a center of measurement of the current is a center of the passive type RFID which becomes point A in FIGS. 1 and 2.

As understood from these figures, according to this embodiment, the current flows in a single direction around the penetrating hole 104 and near outer edges of the notch portion 105 and the lower wall portion 103 as a result of forming the notch portion 105. As a consequence, an axis of a magnetic flux in a reverse direction generated by the eddy current I is shifted on the surface of the lower wall portion 13 from an axis of a magnetic flux produced by electromagnetic waves emitted from the reader/writer, and is located in an internal region of the lower wall portion 103 separated from the passive type RFID held by the penetrating hole 104. As a result, a density of the induced magnetic flux due to electromagnetic waves emitted from the reader/writer never dropped, and an electromagnetic force induced by the antenna did not drop neither. On the other hand, according to the comparative example, a large current flows in a single direction around a center axis of the passive type RFID in the peripheral part of the penetrating hole 204 in the lower wall portion 203, and a so-called eddy current I is generated. Due to the generation of the eddy current I, a magnetic flux is generated in an opposite direction to the direction of an electrode of the magnetic flux produced by electromagnetic waves emitted from the reader/writer, thereby lowering magnetic flux density and further lowering the induced electromotive force generated in the passive type RFID antenna.

FIG. 5 shows changes in density of a magnetic flux generated in a direction of Z-axis at the point A in the embodiment and comparative example described previously shown in FIGS. 3 and 4. A point ● in the figure indicates the magnetic flux density according to the present embodiment and a point X indicates changes in the magnetic flux according to the comparative example. Because electromagnetic waves having a frequency of 13.56 MHz are introduced into a spiral shaped antenna of the passive type RFID, a time of one cycle, namely, 1/13.56 (seconds) was set on an abscissa axis, the time was divided into 16 sections to obtain 16 steps, and then, the magnetic flux density of each step was plotted. From this figure, it is understood that the magnetic flux density of this embodiment at each step has a magnitude substantially nine times larger than the magnetic flux density of the comparative example. This indicates how the present invention succeeds in blocking generation of the eddy current I, thereby expressing how reduction of the induced electromotive force generated in the passive type RFID has been canceled as compared with the conventional example.

As described above, the present invention can obtain a responsiveness which cannot be expected in the responsive performance with respect to a conventional reader/writer by a simple processing of only allowing the notch portion communicating inside with outside of the high magnetic permeability material which holds the electromagnetic induction type passive type RFID to penetrate from a first surface to a second surface to thereby form a discontinuous region with a high magnetic permeability material. In the meantime, second to sixth embodiments described below obtain such a smooth responsiveness that cannot be expected in the responsive performance with respect to the conventional reader/writer in the same manner as in the first embodiment. Thus, the responsive performance of the second to sixth embodiments will not be described below except that their results are referred to. Further, the frequency of the electromagnetic waves emitted from the reader/writer to the electromagnetic induction type passive type RFID of the present invention is not restricted to the above-described 13.56 MHz, but it may be a frequency in a band of 2.45 GHz or other frequencies may be utilized. Furthermore, the width dimension of the notch portion 105 may be varyingly changed. Although it is preferred to be as large as possible, a value varies and an appropriate value is preferred to be selected through an experiment or the like.

SECOND EMBODIMENT

FIGS. 6 to 10 each show an example of a slider for a slide fastener equipped with a passive type RFID according to a second embodiment of the present invention.

As shown in these figures, a slider 10 is made of zinc alloy, and has, in a same manner as in the prior art, a slider body 11 constituted of an upper plate 12, a lower plate 13 and a connecting post 14 for connecting shoulder mouth side end portions of the upper and lower plates 12, 13; a gate-like pull tab attaching post 15 provided to stretch from a front end to a rear end of a top face of the upper plate 12; and a pull tab (not shown) which is attached to the pull tab attaching post 15 and is freely rotatable along the attaching post 15. Pairs of right and left flanges 12a, 13a are formed along right and left edges of the upper and lower plates 12, 13 such that they approach each other vertically. Further, a first rib-like protrusion 13b is provided protrudedly on a top face of the lower plate 13 from the connecting post 14 to a rear mouth in order to guide right and left element rows (not shown). Here, in this specification, a shoulder mouth side provided with the connecting post 14 is called front portion while a rear mouth side not provided with the connecting post 14 is called rear portion. The right and left directions forward from the connecting post 14 are called right and left.

According to this embodiment, the lower plate 13 is used as a holding part of the passive type RFID. An entirely rectangular notch portion 13c is formed from an edge on the rear mouth side of the lower plate 13 up to a position substantially ½ a distance from the edge to the connecting post 14 so as to penetrate from a top face (first surface) of the lower plate to a lower face (second surface) thereof. This notch portion 13c constitutes the penetrating part and notch of the present invention. According to this embodiment, fitting grooves 13d each having a rectangular section are formed in right and left inner wall faces of the notch portion 13c.

On the other hand, a passive type RFID 20 held by the notch portion 13c includes an antenna which has one end in a center thereof and is wound around several turns spirally in a rectangular form from the end, and an IC chip connected to the one end of the antenna. The passive type RFID 20 is entirely sealed by hardening epoxy resin and then molded in a form of a rectangular plate as shown in FIG. 1. According to this embodiment, the passive type RFID 20 formed into the rectangular plate is accommodated and held in an accommodating member 23 molded with a low magnetic permeability material. The accommodating member 23 is also made of epoxy resin, and comprised of vertically separated first and second accommodating members 23a, 23b having first and second accommodating portions 23c, 23d for accommodating the passive type RFID 20 in the shape of the rectangular plate such that the RFID is sandwiched from above and below.

A contour shape when the first and second accommodating members 23a, 23b are overlapped provides a cross-shaped section, more precisely, a square box shape which is to be fitted to the fitting groove 13d in the lower plate 13, as shown in FIG. 2. On a top face thereof, a second rib-like protrusion 23e is provided protrudedly which has a same sectional shape as the first rib-like protrusion 13b extending in back and forth direction in a center of a top face of the slider 10. When the accommodating member 23 which accommodates the passive type RFID 20 is fitted to the fitting groove 13c, a front end face (deep side of FIG. 2) of the second rib-like protrusion 13 makes firm contact with a rear end face (end face on a rear mouth side) of the first rib-like protrusion 13b extending from the connecting post 14 of the slider body 11 to the rear mouth side. First and second concave portions 23c, 23d for the passive type RFID 20 formed in overlapping faces of the first and second accommodating members 23a, 23b are constructed of square plate-like recesses for accommodating the passive type RFID 20 in a fitting condition. A projection thicknesses of short side portions 23a-1, 23b-1 of a laterally crosswise section of the first and second accommodating members 23a, 23b are equal to respective thicknesses between an inner wall face in a vertical direction of the fitting groove 13d in the lower plate 13 and upper/lower surfaces (first and second surfaces) of the lower plate 13 as shown in FIG. 9.

After the passive type RFID 20 is fitted to any one of the accommodating portions 23c, 23d in the first and second accommodating members 23a, 23b, the other accommodating member 23b, 23a is overlapped so that the passive type RFID 20 is fitted to the accommodating concave portion 23d, 23c, and then, it is fixed with an adhesive agent or by fusion. The accommodating member 23 obtained by this integration is held by the fitting groove 13d in the lower plate 13 of the slider 10 as shown in FIG. 8.

Although material of the sealing material and the accommodating member 23 for the passive type RFID 20 is not restricted to the above-described epoxy resin and other resin materials such as, for example, polyester, nylon, and polybutylene terephthalate may be used, it needs to be a low magnetic permeability material.

The notch portion 13a is formed, and the discontinuous region R deprived of zinc alloy is formed in part of the lower plate 13 made of zinc alloy which is a high magnetic permeability material for holding the accommodating member 23 such that it is fitted to the peripheral face of the accommodating member 23 for the passive type RFID 20. Consequently, when electromagnetic waves are emitted from the reader/writer toward the passive type RFID 20, reduction of the induced electromotive force generated in the passive type RFID 20 is suppressed largely as compared to the conventional lower plate having no notch portion, whereby response of the reader/writer is performed smoothly.

FIG. 11 shows a modification of the accommodating member for the passive type RFID 20 according to the second embodiment. According to this modification, a frame-like protrusion portion 23f and a tight-fitting groove 23g, which can tight fit to each other, are formed on contact faces in peripheries of the first and second accommodating concave portions 23c, 23d which are composed of recesses in the first and second accommodating members 23a, 23b. The protrusion portion 23f and tight-fitting groove 23g are not always restricted to an indicated example but may be of any other shape as long as formed to meet a counterpart of the first and second accommodating members 23a, 23b. Forming the protrusion portion 23f and the tight-fitting groove 23g facilitates positioning when overlapping the first and second accommodating members 23a, 23b, and waterproofing performance is improved by fusing together after the both are overlapped. As for a responsiveness between the passive type RFID 20 and the reader/writer, reading and writing between the passive type RFID 20 and the reader/writer are carried out smoothly without any trouble like the second embodiment.

FIGS. 12 and 13 each show another modification of the accommodating member for the passive type RFID 20 according to the second embodiment. According to this modification, a frame-like sealing material 24 is interposed between contact faces in the peripheries of the first and second accommodating portions 23c, 23d constructed of recesses in the first and second accommodating members 23a, 23b. Interposing the sealing material 24 secures waterproofing, so that water is prevented from invading into the first and second accommodating concave portions 23c, 23d in which the passive type RFID 20 has been accommodated. Also in this modification, reading and writing between the passive type RFID and the reader/writer are carried out without any trouble.

FIG. 14 shows still another modification of the accommodating member for the passive type RFID 20 of the second embodiment. This modification is different in that the accommodating member 23 for the passive type RFID 20 is divided to two right and left sections while its contour shape and the shape of the accommodating concave portion are not changed. Also in this modification, reading and writing between the passive type RFID and the reader/writer are carried out smoothly without any trouble.

FIG. 15 shows still another modification of the accommodating member for the passive type RFID 20 of the second embodiment. According to this modification, the accommodating member 23 for accommodating the passive type RFID 20 is integrated with the passive type RFID by injection molding. Of course, the accommodating member 23 is made of a synthetic resin material which is a low magnetic permeability material. This modification secures complete waterproofing, and allows reading and writing between the passive type RFID 20 and the reader/writer to be executed smoothly without any trouble.

FIGS. 16 and 17 each show a third embodiment of the present invention, in which the passive type RFID 20 is mounted and held in the lower plate 13 of the slide fastener slider 10 like the second embodiment. According to this embodiment, the accommodating member 23 for the passive type RFID 20 is formed into a disc-like shape. Also in this embodiment, the accommodating member 23 for accommodating the passive type RFID 20 is injection molded so as to incorporate the passive type RFID 20 integrally. On the other hand, a circular penetrating hole 13e for mounting and holding the passive type RFID 20 and a notch 13f which penetrates from the top face (first surface) to the bottom face (second surface) of the lower plate 13, the notch communicating with the penetrating hole 13b, are formed in the lower plate 13 which is a holding part for the passive type RFID 20. The penetrating hole 13e corresponds to the penetrating part of the present invention.

As shown in FIG. 17, a thickness (vertical dimension) of the accommodating member 23 in the disk-like shape for the passive type RFID 20 is equal to a thickness (vertical dimension) of the lower plate 13. In the indicated example, the accommodating member 23 is in a disk-shape while the notch 13f is kept as space. However, it is permissible to fill the notch 13f with synthetic resin which is a low magnetic permeability material and leave it harden such that the notch is flush with the upper and lower surfaces of the lower plate 13 after the accommodating member 23 is fixed in the penetrating hole 13e by using an adhesive agent or the like with the passive type RFID 20 accommodated therein. Also in this embodiment, reading and writing between the passive type RFID and the reader/writer can be carried out smoothly without any trouble in the same manner as in the first and second embodiments.

FIGS. 18 and 19 each show a fourth embodiment of the present invention, in which the pull tab attaching post 15 of the slider 10 for a slide fastener is used as the holding part for the passive type RFID 20. According to this embodiment also, the slider 10 is made of zinc alloy, and has, in a same manner as in the second and third embodiments, a slider body 11 constructed of an upper plate 12, a lower plate 13 and a connecting post 14 for connecting shoulder mouth side end portions of the upper and lower plates 12, 13; a gate-like pull tab attaching post 15 provided to stretch between the front end and rear end of the top face of the upper plate 12; and a pull tab 16 which is mounted on the pull tab attaching post 15 and is rotatable in a back and forth direction along the attaching post 15. Pairs of right and left flanges 12a, 13a are formed along right and left edges of the upper and lower plates 12, 13. Further, a first rib-like protrusion 13b is provided protrudedly on the top face of the lower plate 13 from the connecting post 15 to a rear mouth in order to guide right and left element rows (not shown).

According to this embodiment, the gate-like pull tab attaching post 15 is divided into its front portion and rear portion at a center thereof, and comprised of a front post 15a which is erected from the shoulder mouth side end portion of the upper plate 12 of the slider 10 and bent extending to the rear mouth side and a rear post 15b which is erected from the rear mouth side end portion of the upper plate 12 and bent extending to the shoulder mouth side. A predetermined gap is set between opposing end faces of the front and rear posts 15a, 15b, and first and second fitting grooves 15c, 15d are formed in the front and rear posts 15a, 15b such that they are parallel to the top face of the upper plate 12 and open to right and left while intersecting the front and rear posts 15a, 15b. The opposing end portions of the front and rear posts 15a, 15b are expanded downward as shown in FIG. 19, so that a vertical thickness is larger than those of other portions. A space between the opposing end faces of the front and rear posts 15a, 15b in this embodiment corresponds to the penetrating part and notch of the present invention.

On the other hand, the accommodating member 23 for the passive type RFID 20 sealed with epoxy resin is constructed of first and second accommodating members 23a, 23b which are separated to upper and lower portions like the second embodiment as shown in FIG. 19. Square shaped first and second accommodating concave portions 23c, 23d, to which each half portion of the passive type RFID 20 is fitted, are formed in abutting faces of the first and second accommodating members 23a, 23b. A sectional shape of the accommodating member 23 as seen from a side face is laterally crosswise as shown in FIG. 19, and a bottom end of a short side portion 23b-1 of the second accommodating member 23b on a lower side which is one of short side portions 23a-1 and 23b-1 of the first and second accommodating members 23a, 23b is formed into a mountain-like shape expanded downward so as to be continuous to the bottom face expanded portion of the opposing end portions of the front and rear posts 15a, 15b. In this embodiment also, as shown in FIG. 18, long side portions 23a-2, 23b-2 of the first and second accommodating members 23a, 23b are fitted and fixed to the first and second fitting grooves 15c, 15d with an adhesive agent or by fusion.

It is natural that this embodiment can exert a function of the passive type RFID 20 sufficiently for a same reason as described in the first embodiment. Moreover, because the bottom face of the accommodating member 23 for the passive type RFID and the bottom face of the opposing end portions of the front and rear posts 15a, 15b form a curved face which is expanded downward, the pull tab 16 is guided to a bent portion of the front or rear post 15a, 15b smoothly when the pull tab is pulled. As a consequence, no load is applied to the accommodating member 23 for the passive type RFID 20 when the pull tab 16 is pulled, thereby preventing the accommodating member 23 from being damaged.

FIGS. 20 to 25 show first to sixth modifications of the third embodiment in which the pull tab attaching post 15 is used as the holding part for the passive type RFID 20. These modifications also allow the function of the passive type RFID 20 to be exerted sufficiently in the same manner as in the third embodiment, thereby achieving smooth communication with the reader/writer.

According to the first modification shown in FIG. 20, the pull tab attaching post 15 is not divided to its front and rear portions unlike the third embodiment, but a penetrating part 15e having a rectangular section which penetrates first and second surfaces, right and left, is formed in the center of the pull tab attaching post 15, and a notch 15f penetrating the first and second surfaces while communicating with outside is formed in a bottom face of the penetrating part 15e. On the other hand, the accommodating member 23 for accommodating the passive type RFID 20 molded sealingly with epoxy resin is formed entirely in a T shape as shown in the same figure. Its horizontal portion 23e is fitted to the penetrating part 15e in the pull tab attaching post 15 and its vertical portion 23f is fitted to the notch 15f while they are fixed integrally with an adhesive agent or by fusion. In this modification, the accommodating member 23 is divided into two right and left sections, i.e., first and second accommodating members 23a, 23b. The first and second accommodating portions 23c, 23d for accommodating the half portions of the passive type RFID 20 respectively are formed in the abutting faces.

According to the second modification shown in FIG. 21, the pull tab attaching post 15 is not divided into its front and rear portions like the first modification, but a penetrating groove 15g which penetrates in a right and left direction while its top face being open is formed in the center of the pull tab attaching post 15 with its bottom expanded portion left, and a pair of fitting grooves 15h with their top faces open are formed in front and rear inner wall faces of the penetrating groove 15g. The penetrating groove 15g corresponds to the penetrating part and notch of the present invention. On the other hand, the accommodating member 23 for accommodating the passive type RFID 20 molded sealingly with epoxy resin provides a crosswise section entirely as seen in plan view as shown in the figure, and is divided into two front and rear sections, namely, the first and second accommodating members 23a, 23b. Its long side portions 23a-2, 23b-2 are fitted to the fitting groove 15h and its short side portions 23a-1, 23b-1 are fitted to the penetrating hole 15g while they are fixed integrally with an adhesive agent or by fusion.

According to the third modification shown in FIG. 22, the holding part for the accommodating member 23 in which the passive type RFID 20 has been accommodated is formed in a rising end portion on the shoulder mouth side of the pull tab attaching post 15. The penetrating part of the present invention in this modification is a penetrating hole 15i having a rectangular section and penetrating in a back and forth direction of the rising end portion, and the notch of the present invention is a horizontal fitting groove 15j traversing horizontally through a central portion of the penetrating hole 15i. On the other hand, the accommodating member 23 for accommodating the passive type RFID 20 molded sealingly with epoxy resin is comprised of first and second accommodating members 23a, 23b, which are separable right and left members, and contains first and second accommodating concave portions 23c, 23d for accommodating each half of the passive type RFID 20 on its contact face. The accommodating member 23 is formed entirely in a laterally crosswise shape. The accommodating member 23 having such a configuration is fitted to the penetrating hole 15i and the horizontal fitting groove 15j such that a center line of the passive type RFID 20 penetrates along the horizontal fitting groove 15j, and is fixed integrally with an adhesive agent or by fusion.

FIG. 23 shows the fourth modification, according to which the holding part for the accommodating member 23 in which the passive type RFID 20 has been accommodated is formed in the rising end portion on the shoulder mouth side of the pull tab attaching post 15 in the same manner as in the third embodiment. In this modification, the penetrating part of the present invention is a penetrating hole 15i having a circular section and extending through in the right and left direction of the rising end portion of the pull tab attaching post 15, and the notch of the present invention is a horizontal fitting groove 15j communicating with the entire penetrating hole 15i and open to the rear face (front side in the figure) of the rising end portion of the pull tab attaching post 15. On the other hand, the accommodating member 23 for accommodating the passive type RFID 20 molded sealingly with epoxy resin provides a contour in which a parallel protrusion to a axis direction is provided on part of a peripheral face of a cylindrical portion, and is divided into two sections in a length direction. First and second accommodating concave portions 23c, 23d for accommodating each half of the passive type RFID 20 are formed in the abutting faces of the first and second accommodating members 23a, 23b. The accommodating member 23 having the passive type RFID 20 accommodated therein is fitted to the penetrating hole 15i and the horizontal fitting groove 15j in the pull tab attaching post 15, and is fixed integrally with an adhesive agent or by fusion.

According to the fifth modification shown in FIG. 24, the holding part for the accommodating member 23 in which the passive type RFID 20 has been accommodated is formed in the rising end portion on the shoulder mouth side of the pull tab attaching post 15. In this modification, a ring-like protrusion 15k is provided on a front face of the rising end portion of the pull tab attaching post 15 so as to project forward. A notch 15l communicating inside with outside is formed in part of this protrusion 15k, and a central penetrating hole 15i in the ring-like protrusion 15k corresponds to the penetrating part of the present invention. On the other hand, the passive type RFID 20 molded sealingly with epoxy resin is accommodated integrally in the accommodating member 23 composed of epoxy resin or the like by injection molding. This accommodating member 23 is molded into a disc fitting to the central penetrating hole 15i. Moreover, an appropriate picture such as a bird shape is recessed in front and rear faces of the disc-like accommodating member 23.

According to the sixth modification shown in FIG. 25, the holding part for the accommodating member 23 in which the passive type RFID 20 has been accommodated is formed in an end portion on the rear mouth side on an opposite side to the rising end portion on the shoulder mouth side of the pull tab attaching post 15. The pull tab attaching post 15 provides a cantilever-like shape whose proximal end is a rising end portion on the shoulder mouth side thereof. A blind hole 15m having a rectangular section is formed in the end portion on the rear mouth side along the top face of the upper plate 12 while a tight-fitting groove 15m is formed to penetrate in the right and left direction traversing the blind hole 15m in the pull tab attaching post 15 horizontally. This tight-fitting groove 15n corresponds to the penetrating part of the present invention, and an opening portion formed on the front face (front side in FIG. 25) of the tight-fitting groove 15n and the blind hole 15m corresponds to the notch of the present invention. On the other hand, an entire contour of the accommodating member 23 for accommodating the passive type RFID 20 molded sealingly with epoxy resin has same shape and structure as those of the third modification, and the accommodating member 23 is tight fitted to inside of the fitting grove 15n and the blind hole 15m constructed in a laterally crosswise shape, and is fixed integrally with an adhesive agent or the like.

FIGS. 26 and 27 each show the fifth embodiment of the present invention. Also in this embodiment, the passive type RFID 20 molded sealingly with epoxy resin is mounted on and held by the slider 10 for the slide fastener. The holding part is the connecting post 14 for connecting the upper and lower plates 12, 13. This connecting post 14 is composed of a polygonal column, and connects the upper and lower plates 12, 13 on the shoulder side end portion (front end portion) of the slider 10. A crosswise fitting groove 14a is formed in a front end face of the connecting post 14. A horizontal groove portion 14a-1 of the fitting groove 14a penetrates in a right and left direction of the connecting post 14, and a vertical groove portion 14a-2 has upper and lower end portions.

On the other hand, the accommodating member 23 for accommodating the passive type RFID 20 is comprised of first and second accommodating members 23a, 23b, which are separable right and left members, and entirely provides a crosswise shape in which first and second accommodating concave portions 23a, 23b are formed in their abutting faces, each half of the passive type RFID 20 being fitted to the first and second accommodating concave portions. In this embodiment, the horizontal groove portion 14a-1 of the connecting post 14 formed in the front end face of the connecting post 14 corresponds to the penetrating part of the present invention, and an opening portion on the front side (front side in FIG. 26) of the horizontal groove portion 14a-1 and the vertical groove portion 14a-2 corresponds to the notch of the present invention. The accommodating member 23 having the passive type RFID 20 accommodated therein is fitted to the fitting groove 14a formed in the connecting post 14, and is fixed integrally with an adhesive agent or the like.

FIGS. 28 and 29 each show the sixth embodiment of the present invention, according to which also, the passive type RFID 20 molded sealingly with epoxy is mounted and held in the slider 10 for the slide fastener. The holding part is located in the upper plate 12 of the slider 10 and its right or left flange 12a. According to the indicated example, the accommodating member 23 for accommodating the passive type RFID 20 molded sealingly into a square shape with epoxy resin is comprised of first and second accommodating members 23a, 23b, which are separable right and left members, and the first and second accommodating concave portions 23c, 23d for accommodating the passive type RFID 20 are formed in their abutting faces. An entire shape of this accommodating member 23 provides a sealed box configuration having a laterally crosswise section, as seen from top.

On the other hand, as shown in FIGS. 28 and 29, a notch portion 12b having a laterally crosswise section when seen from above and a rectangular section as seen from a side of the flange 12a is formed in a right or left end portion of the upper plate 12 of the slider 10 for holding the accommodating member 23 and a part of the flange 12a of any of them. A notch part 12b-1 formed in the flange 12a of the notch portion 12b corresponds to the penetrating part of the present invention, and an opening portion which is open to the top face of the upper plate of the notch part 12b-1 and a T-shaped penetrating part 12b-2 formed in the upper plate 12 corresponds to the notch of the present invention.

With the above-described structure of this embodiment, the accommodating member 23 for accommodating the passive type RFID 20 molded sealingly in the form of a square plate with epoxy resin is fitted to and fixed to the notch portion 12b formed in the upper plate 12 of the slider 10. That is, in the passive type RFID 20 accommodated in the accommodating member 23, a central portion of a spiral antenna communicates with outside only through a synthetic resin material such as epoxy resin which is a low magnetic permeability material. Because no metal which is a high magnetic permeability material exists and at a same time, part of metal existing in a neighborhood forms a discontinuous region on the top face of the upper plate 12, no eddy current with the central portion of the spiral antenna as an axis is generated, whereby achieving smooth communication with the reader/writer, in the same manner as in the first embodiment.

FIG. 30 shows a modification of the holding part for the passive type RFID 20 of the sixth embodiment. The holding part for the passive type RFID 20 of this modification is not part of the upper plate 12 and its flange 12a unlike the fifth embodiment, but formed in an end portion on the rear mouth side on an opposite side to the connecting post 14 of any flange 12a of the right and left ones of the upper plate 12. That is, an accommodating member fitting groove 12c which is open rearward (front side in the same figure) and has a lateral crosswise section open to right and left is formed in an end portion on the rear mouth side of the upper plate 12 and any one of its right and left flanges 12a.

On the other hand, the accommodating member 23 for accommodating the passive type RFID 20 molded sealingly in the form of a square plate with epoxy resin is comprised of first and second accommodating members 23a, 23b, which are separable right and left members in the same manner as in the fifth embodiment. First and second accommodating concave portions 23c, 23d for accommodating each half of the passive type RFID 20 are formed in their abutting faces, and the accommodating member is fitted to the accommodating member fitting groove 12c formed in the end portion on the rear mouth side of the upper plate 12 and any one of the right and left flanges 12a.

FIG. 31 shows a seventh embodiment of the present invention, in which the holding part for the passive type RFID 20 is formed in the pull tab 16 of the slider for a slide fastener. The pull tab attaching post 15 provided on the top face of the slider body 11 is inserted into a proximal end portion of the pull tab 16, and a ring portion 16a rotatable in a back and forth direction is formed. The ring portion 16a has a rotary shaft portion 16b, whose both ends are supported pivotally by the pull tab attaching post 15 at its proximal end.

According to this embodiment, a holding part for the passive type RFID 20 is formed in a wall portion on a free end portion of the ring portion 16a. In this holding part, a notch portion 16c is formed which is open to an inner wall face of the ring portion 16a and upper and lower surfaces on a free end portion side and has a lateral crosswise section as seen from the inner wall face. On the other hand, a basic shape and structure of the accommodating member 23 for accommodating the passive type RFID 20 molded sealingly in the form of a square plate with epoxy resin or the like is a crosswise box which can be fitted to the notch portion 16c like the second embodiment. Electromagnetic waves are emitted to the passive type RFID 20 fitted to the notch portion 16c from the reader/writer in a vertical direction of the pull tab 16. In this case, a penetrating region in which the upper and lower surfaces of the notch portion 16c are open corresponds to the penetrating part of the present invention, and an open region in an inner wall face of the notch portion 16c corresponds to the notch of the present invention.

FIG. 32 shows a modification of the above-described seventh embodiment, according to which the holding part for the passive type RFID 20 molded sealingly in the form of a square plate with epoxy resin or the like is formed in a side edge of any one of right and left sides of the pull tab 16 in a width direction. That is, the notch portion 16c which is open to a side end face while open to the upper and lower surfaces, extending toward a side edge on an opposite side and has the same shape as the seventh embodiment is formed in the side edge portion. Thus, the accommodating member 23 for accommodating the passive type RFID 20 has substantially the same shape and structure as the above-described seventh embodiment.

FIG. 33 shows another modification of the seventh embodiment. According to this modification, a circular hole portion 16d is formed in a free end portion on an opposite side to the ring portion 16a of the pull tab 16, and a notch 16e communicating inside with outside of the circular hole portion 16a is formed. The hole portion 16d in this modification corresponds to the penetrating part of the present invention. The accommodating member 23 for accommodating the passive type RFID 20 molded sealingly in the form of a rectangular plate with epoxy resin or the like is molded circularly with the passive type RFID 20 incorporated therein by injection molding. This circular accommodating member 23 is fixed integrally in the hole portion 16d of the pull tab 16 with an adhesive agent or by fusion.

FIG. 34 shows an eighth embodiment of the present invention. According to this embodiment, the passive type RFID 20 molded sealingly in the form of a rectangular plate with epoxy resin or the like is mounted on and held by a metallic button 30. This button 30 is constituted of a circular main body 31 and a loop-like mounting portion 32 projecting from a center of a second surface which is a rear face of the main body 31. The main body 31 is used as the holding part for the passive type RFID 20. A notch portion 31a extending toward the center is formed in part of a peripheral part of the main body 31. The notch portion 31a has substantially the same shape as the notch portion 16c shown in FIG. 32, and is open to first and second surfaces which are front and rear surfaces of the button main body 31 in a rectangular shape while open to a peripheral face in a laterally crosswise shape. Thus, the accommodating member 23 for accommodating one passive type RFID 20 has substantially the same contour and structure as the entire contour of the accommodating member 23 in the modification of the pull tab 16 shown in FIG. 32. In the meantime, the accommodating member 23 of this embodiment is molded integrally with the passive type RFID 20 incorporated therein by injection molding of a synthetic resin material.

FIG. 35 shows a ninth embodiment of the present invention. According to this embodiment also, the passive type RFID 20 molded sealingly in the form of a rectangular plate with epoxy resin or the like is mounted on and held by a button 33. The button 33 of this embodiment is comprised of a metallic cylindrical attaching portion 34, a circular base part 35 extending radiantly at right angle from an end of the cylindrical attaching portion 34, and a covering member 36 made of a synthetic resin material for covering an entire circular base part 35 integrally. The holding part for the passive type RFID 20 is a rectangular notch portion 35a which is open to the peripheral face and penetrates to the first and second surfaces which are front and rear faces of the circular base part 35 in part of the circular base part 35. The accommodating member 23 for accommodating the passive type RFID 20 is fitted to and fixed to this notch portion 35a. According to this embodiment, the accommodating member 23 is fitted to and fixed to the notch portion 35a, and thereafter, the circular base part 35 is covered with the covering member 36 at a same time when the covering member 36 is molded.

FIGS. 36 and 37 each show a tenth embodiment of the present invention. According to this embodiment, the passive type RFID 20 molded sealingly in the form of a rectangular plate with epoxy resin or the like is held by an eyelet which is one of members constituting a female member of a metallic snap button. This kind of the snap button 40 is comprised of a male member 41 and a female member 42 as shown in FIG. 37, and the male member 41 includes a circular flange portion 41a and a projecting portion 41b which projects from a center of the flange portion 41a and has a projecting head portion at a front end thereof. The female member 42 includes a button main body 43 having an engagement/disengagement hole 43a which the projecting head portion of the projecting portion 41b of the male member 41 engages with and having a T-shaped longitudinal section; a spring 44 whose part projects into a hole from an inner wall face of the engagement/disengagement hole 43a; and an eyelet 45 which is attached to the button main body 43 by crimping part thereof to a boss portion 43a of the button main body 43.

The eyelet 45 of this embodiment includes a circular metallic base part 45a; a metallic cylindrical attaching portion 45b projecting vertically from a center of the base part 45a; and a covering member 45c made of synthetic resin which is a low magnetic permeability material and fixed integrally and continuously to the peripheral part of the base part 45a. According to this embodiment, part of the peripheral part of the base part 45a is used as the holding part for holding the accommodating member 23 for accommodating the RFID 20.

This holding part is a notch portion 46 formed by cutting part of the peripheral part of the base part 45a into a cubic shape toward the center from the periphery This notch portion 45 corresponds to the penetrating part and notch of the present invention. The accommodating member 23 is comprised of square box shaped first and second accommodating portions 23a, 23b as shown in FIG. 36, and their accommodating concave portions 23c, 23d are sealed with each half of the RFID 20 accommodated therein. The accommodating member 23 having the passive type RFID 20 accommodated in the respective accommodating concave portions 23c, 23d is held by the notch portion 46 of the eyelet 45. With the accommodating member held, a covering member 47 made of synthetic resin is integrally molded so as to cover the accommodating member 23 held by the peripheral part of the base part 44a and the notch portion 46.

FIG. 38 shows a modification of the accommodating member 23 according to the tenth embodiment. According to this modification, the first and second accommodating members 23a, 23b of the accommodating member 23 are not formed into just a box whose face is open, but frame portions 23c-1, 23d-1 are provided protrudedly on a surface of a square flat plate so as to accommodate half portions of the passive type RFID 20. After the RFID 20 is accommodated in the frame portions 23c-1, 23d-1, the frame portions 23c-1, 23d-1 are butted with each other and fixed together with an adhesive agent or the like. At this time, a frame-like fitting groove 23-1 is formed between the flat plates of the first and second accommodating members 23a, 23b around the frame portions 23c-1, 23d-1. On the other hand, a lateral width of the notch portion 46 is set equal to a length of a side of the frame portions 23c-1, 23d-1, and the passive type RFID is held with the notch portion 46 fitted to the fitting groove 23-1. That is, according to this modification, the passive type RFID 20 is held securely by the notch portion 46.

FIGS. 39 and 40 each show an eleventh embodiment of the present invention. According to this embodiment, a first accommodating member 23a of the accommodating member 23 for accommodating the passive type RFID 20 molded sealingly in the form of a rectangular plate with epoxy resin or the like is formed in a disc shape, a penetrating hole 23a-3 is formed in a center thereof, and a slit 23a-4 communicating with the same penetrating hole 23a-3 inside to outside is formed. As shown in FIG. 40, a cylindrical attaching portion 45b of an eyelet 45 having the same structure as that of the tenth embodiment is fitted to the penetrating hole 23a-3 through the slit 23a-4, and makes firm contact with a top face of a base part 45a of the eyelet 45. When this cylindrical attaching portion 45b is fitted, the slit 23a-4 is deformed elastically so as to expand an opening width of the slit 23a-4, and the cylindrical attaching portion 45b is fitted to and fixed to the penetrating hole 23a-3. A square-like frame portion 23a-5 for accommodating each half of the passive type RFID 20 sealed with resin is formed in a peripheral part of the first accommodating portion 23a opposite to the slit 23a-4 of the first accommodating member 23a across the penetrating hole 23a-3.

On the other hand, the second accommodating member 23b has the same structure as that of the above-described modification of the tenth embodiment. A half portion of the passive type RFID 20 is accommodated in the frame portion 23d-1, and the frame portion 23d-1 is butted to the frame portion 23a-5 of the first accommodating member 23a and integrated with an adhesive agent or the like. As a consequence, the fitting groove 23-1 to which the notch portion 46 formed on the periphery of the eyelet 45 is to be fitted is formed in this accommodating member 23 like the tenth embodiment, so that the cylindrical attaching portion 45b of the eyelet 45 is fitted and fixed to the penetrating hole 23a-3 while the accommodating member 23 is held by the base part 45a in the eyelet 45.

FIGS. 41 and 42 each show a twelfth embodiment of the present invention. According to this embodiment, the passive type RFID 20 molded sealingly in the form of a rectangular plate with epoxy resin or the like is fitted to and held by a metallic belt adjuster 50. The belt adjuster 50 is constructed of a rectangular frame body 51 constituted of a pair of longitudinal levers 51a and a pair of lateral levers 51b; and a belt attaching lever 51c for connecting central portions of the pair of longitudinal levers 51a. An end of the belt 52 is wound around and fixed to the belt attaching lever 51c of the belt adjuster 51. To adjust a length of the belt 52, as shown in FIG. 41, the other end of the belt 52 is passed through a space between one lateral lever 51b and the belt attaching lever 51c so as to overpass the belt attaching lever 51c. Then, it is submerged into a space between the belt attaching lever 51c and the other lateral lever 51b and taken out. A degree of tightening of the belt 52 is adjusted by adjusting a pulling-out amount of the belt.

According to this embodiment, the passive type RFID 20 is mounted on and held by one of the pair of the lateral levers 51b. Thus, a notch portion 53 is formed in part of the lateral lever 51b so as to hold the passive type RFID 20. This notch portion 53 is formed by cutting out part of the lateral lever 51b over a predetermined width, and an accommodating member fitting groove 53b is formed in each cut-out face 53a. On the other hand, the accommodating member 23 for accommodating the passive type RFID 20 has substantially the same configuration and structure as those of the accommodating member 23 shown in FIG. 31 which is fitted to the notch portion 53 of the lateral lever 51b. In this embodiment, the notch portion 53 constitutes the penetrating part and notch of the present invention.

FIG. 43 shows a thirteenth embodiment of the present invention. According to this embodiment, a notch portion 56 having substantially the same shape as the eleventh embodiment is formed in part of the longitudinal lever 55a which is a short side portion of a belt attaching ring 55 constructed of a rectangular frame body, and the accommodating member 23 having the passive type RFID 20 accommodated therein and having substantially the same configuration and structure as those of the eleventh embodiment is fitted and fixed to the same notch portion 56.

FIG. 44 shows a fourteenth embodiment of the present invention. According to this embodiment, the passive type RFID 20 is mounted on and held by a rectangular belt attaching ring 61 of a metallic swivel 60. The swivel 60 includes the attaching ring portion 61 and a hook portion 62 to which a first lateral lever 61a of a pair of first and second lateral levers 61a, 61b, which are long side portions of the attaching ring 61, is connected rotatably around a vertical axis thereof relatively. A pivoting shaft 63a which supports pivotally an escape preventing piece 63 for preventing a hooked object (not shown) from escaping is mounted on a proximal portion of this hook portion 62.

The passive type RFID 20 is mounted on and held by the second lateral lever 61b disposed opposing the first lateral lever 61a which connects the hook portion 62. The holding part for the passive type RFID 20 is a notch portion 64 equal to FIG. 37, and the notch portion 64 is produced by cutting out part of the second lateral lever 61b over a predetermined width. Then, an accommodating member fitting groove 64b is formed in each notch face 64a in a same direction as a direction perpendicular to a plane surrounded by a rectangular center line of the belt attaching ring portion 61. Thus, on the other hand, the accommodating member 23 for the passive type RFID 20 has substantially the same structure and shape as those of the accommodating member shown in FIG. 37, and is fitted to the notch portion 64 and fixed with an adhesive agent or the like.

FIG. 45 shows a fifteenth embodiment of the present invention. In this embodiment, a measure for protecting a variety of data including personal data written in the passive RFID 20 from being read out falsely is taken. In the slider 10 for the slide fastener according to the second embodiment, a U-shaped shielding member fitting groove 17 is formed in the bottom face of the lower plate 13 so as to surround the notch portion 13c formed in the lower plate 13. On the other hand, a shielding member 18 to be fitted to the shielding member fitting groove 17 is composed of a small piece having a shape shown in FIG. 45 made of a high magnetic permeability material, for example, metallic. That is, a bent piece 18b is formed by bending an end in a length direction of a rectangular plate piece 18a at right angle, and thin edge portions 18c are formed through each step portion by cutting out both edge portions in a short side direction along the both edges including the bent piece 18a.

The shielding member 18 is attached to the bottom face of the lower plate 13 by fitting the thin edge portions 18c to the shielding member fitting groove 17. The bottom face of the accommodating member 23 which has the passive type RFID 20 accommodated therein and is fitted to the notch portion 13c is shielded by the shielding member as a result of attaching the shielding member 18, and at a same time, the notch portion 13c in the bottom plate 13 is connected to the shielding member 18 so as to form a continuous metallic region. Consequently, an eddy current is generated around a center of the shielding member 18 as an axis by electromagnetic waves emitted from the reader/writer and then, a demagnetizing filed is generated to eliminate a magnetic flux of the electromagnetic waves, thereby largely reducing an induced electromotive force generated in the spiral antenna of the passive type RFID 20 to disable response to the reader/writer.

The bent piece 18b is used as a knob for pulling out the shielding member 18 from the fitting groove 17.

FIG. 46 shows a modification of the fifteenth embodiment. According to this modification, the shielding member fitting groove 17 is abandoned, and the shielding member 18 is bonded to the above-mentioned shielding region through an adhesive agent layer 19. Therefore, the shielding member 18 of this modification may be just a rectangular plate piece, and the adhesive agent layer 19 is formed on a surface preliminarily while a peel paper is kept bonded to an exposed face of the adhesive agent layer 19 until actually used. This modification is effective in that it can disable reading of various kinds of data including personal data intentionally at any time.

FIGS. 47 to 50 show sixteenth to eighteenth embodiments of various articles provided with the passive type RFID 20 of electromagnetic induction method of the present invention theoretically different from the first to fifteenth embodiments.

Means for improving response performance between the passive type RFID 20 in an article shown in these figures and a reader/writer (not shown) prevents an eddy current from being generated around the passive type RFID 20 by interposing an electromagnetic shielding member between a metallic holding part and the passive type RFID 20, for example, a ferrite sheet piece, without forming any penetrating part or a notch in a high magnetic permeability material for holding the passive type RFID 20, for example, a metal, to make the electromagnetic shielding member absorb magnetic flux passing a central portion of the spiral antenna of the passive type RFID 20.

According to the sixteenth embodiment shown in FIGS. 47 and 48, an accommodating member 123 in which the passive type RFID 20 molded sealingly in the form of a rectangular plate with epoxy resin or the like has been embedded is mounted on and held by an upper plate 72 of a slider 70 for a slide fastener. As shown in FIGS. 47 and 48, this accommodating member 123 comprises a square thin plate portion 123*a*; and a step-like block piece 123*b* which is disposed on one side of the thin plate portion 123*a* and extended partially from the thin plate portion 123*a* so as to be flush with a bottom face of the thin plate portion 123*a* with both end portions of the thin plate portion 123*a* left. An upper step portion 123*b*-1 of the step-like block piece 123*b* exists commanding the one side of the thin plate portion, and its lower step portion 123*b*-2 extends forward from the one side of the thin plate portion 123*a*. These thin plate portion 123*a* and step-like block piece 123*b* are formed integrally by injection molding so as to incorporate the passive type RFID 20 in the step-like block piece 123*b*.

On the other hand, the slider 70 to be equipped with the accommodating member 123 comprises a slider body 71 constituted of an upper plate 72, a lower plate 73 and a connecting post 74 for connecting shoulder mouth side end portions of the upper plate 72 and lower plate 73; a pull tab attaching post 75 which is raised vertically from a shoulder mouth side end, extends horizontally backward, bends and approaches the top face of the upper plate 72 on a rear mouth side end; and a pull tab (not shown) which is attached to the pull tab attaching post 75 and is rotatable along the attaching post 75. A pair of right and left flanges 72*a*, 73*a*, approaching each other vertically, are formed along right and left edges of the upper and lower plates 72, 73. A rib-like protrusion 73*b* for guiding right and left element rows (not shown) are provided from the connecting post 74 up to a rear mouth on the top face of the lower plate 73. Here, the shoulder mouth side provided with the connecting post 74 is referred to as the front portion, and the rear mouth side provided with no connecting post 74 is referred to as the rear portion. Furthermore, right and left directions when looked forward from the connecting post 74 are referred to as right and left.

According to this embodiment, the pull tab attaching post 75 is a cantilever type attaching post which is raised upward from the front end of the upper plate 72, bends horizontally and bends toward the top face of the rear end portion of the upper plate 72, having a predetermined gap between a bent end face and the top face of the rear end portion of the upper plate 72. A top face of a rear half portion of the upper plate 72 is cut by half a thickness of a plate into an inverted-T shape. A tunnel-shaped rib-like protrusion 72*b* is provided protrudedly between a front end of an inverted-T shaped cut portion and a rear end face of a rising end portion of the pull tab attaching post 75. A compression spring 76 is inserted into a hollow portion in the rib-like protrusion 72*b*. Fitting grooves 72*a*-1, 72*a*-1 for guiding the right and left side edges in a fitting condition are formed in right and left opposing wall faces of a leg portion 72*c* in the inverted T shaped cut portion. Escape preventing protrusions 72*e*, 72*e* having a same height as the upper step portion 123*b*-1 of the step-like block piece 123*b* of the accommodating member 123 are provided protrudedly at an intersecting portion between right/left arm portions 72*d* and a fitting port of the fitting groove 72*a*-1 in the inverted T shaped cut portion.

Reference numeral 81 in the same drawing designates an electromagnetic shielding member which is a characteristic member of this embodiment, which is a rectangular sheet piece composed of ferrite or the like, providing a rectangular shape substantially equal to the shape of the bottom face of the accommodating member 123. The electromagnetic shielding member 81 is pushed to an end face of the rib-like protrusion 72*b* resisting an urging force of the compression spring 76 so as to be fitted to the fitting grooves 72*a*-1, 72*a*-1 with the accommodating member 123 overlapping the electromagnetic shielding member 81. At this time, the electromagnetic shielding member 81 and right/left rear end faces of the thin plate portion 123*a* of the accommodating member 123 are butted to the escape preventing protrusions 72*e*, 72*e* by an urging force of the compression spring 76 so as not to escape easily.

When the electromagnetic shielding member 81 and the accommodating member 123 are set on the top face of the upper plate 73, the top face of the upper step portion 123*b*-1 of the accommodating member 123 is positioned at a position opposing the bent end face of the pull tab attaching post 75. That is, when installing a pull tab (not shown) on the pull tab attaching post 75, the electromagnetic shielding member 81 and the accommodating member 123 are kept removed from the upper plate 72. After the pull tab is installed on the pull tab attaching post 75, the electromagnetic shielding member 81 and the accommodating member 123 are set on the inverted T shaped leg portion 72*c* of the upper plate 73. After this setting, the pull tab is blocked from escaping by the upper step portion 123*b*-1.

According to this embodiment, a magnetic flux passing the center of the spiral antenna of the passive type RFID 20 is absorbed by the electromagnetic shielding member 81, so that generation of the eddy current around the passive type RFID 20 is blocked, thereby inducing no trouble in communication with the reader/writer.

According to the seventeenth embodiment shown in FIG. 49, an accommodating member 223 in which the passive type RFID 20 molded sealingly in the form of a rectangular plate with epoxy resin or the like has been embedded is mounted on and held by a button 85. The button 85 of this embodiment has a same basic structure as that of the button shown in FIG. 35, and comprises a circular flange portion 86*a*, a button main body 86 having a T-shaped section constituted of a cylindrical attaching portion 86*b* projecting downward from the center of the bottom face of the circular flange portion 86*a*, and a covering member 87 made of synthetic resin molded integrally to cover the flange portion 86*a* surrounding top face and lower face peripheral part of the circular flange portion 86*a*. According to this embodiment, the electromagnetic shielding member 81 which is a characteristic member of the present invention is interposed between the accommodating member 223 and the circular flange portion 86*a*. The accommodating member 223 and the electromagnetic shield member 81 are integrated with the covering member 87 at a same time when the covering member 87 is molded. This embodiment also blocks generation of the eddy current in the circular flange portion 86*a* by absorbing the magnetic flux by means of the electromagnetic shield member 81 like the fifteenth embodiment.

According to an eighteenth embodiment shown in FIG. 50, the accommodating member 223 in which the passive type RFID 20 molded sealingly in the form of a rectangular plate with epoxy resin or the like has been embedded in a tack 89 which attaches a same button main body 90 to fabric 91 of clothes or the like. In this embodiment also, the passive type RFID 20 is embedded inside the accommodating member 223 at the same time when it is molded.

The tack 89 is formed of a metal material, and comprised of a circular flange portion 89*a* and a column portion 89*b* which is erected from the center of the circular flange portion 89*a* and which has a piercing head portion. According to this embodiment, a circular recessed portion 89*a*-1 is formed in a center of the surface on a side in which no column portion 89*a* is erected of the circular flange 89*a*, and a circular disc-like electromagnetic shield member 92 is fitted thereto. Further, the accommodating member 223 in which the passive type RFID 20 has been embedded is fixed to and held in a center of a bottom face with an adhesive agent. In this button 88, the electromagnetic shield member 81 is interposed between the metallic circular flange portion 89*a* and the passive type RFID 20. Accordingly, the magnetic flux passing through the central portion of the spiral antenna in the passive type RFID 20 is absorbed by the electromagnetic shield member 81 so as to block generation of the eddy current around the passive type RFID 20. As a consequence, the induced electromotive force generated in the antenna of the passive type RFID 20 is not dropped, thereby achieving smooth communication with the reader/writer.

EXPLANATION OF REFERENCE NUMERALS

Figure 1:
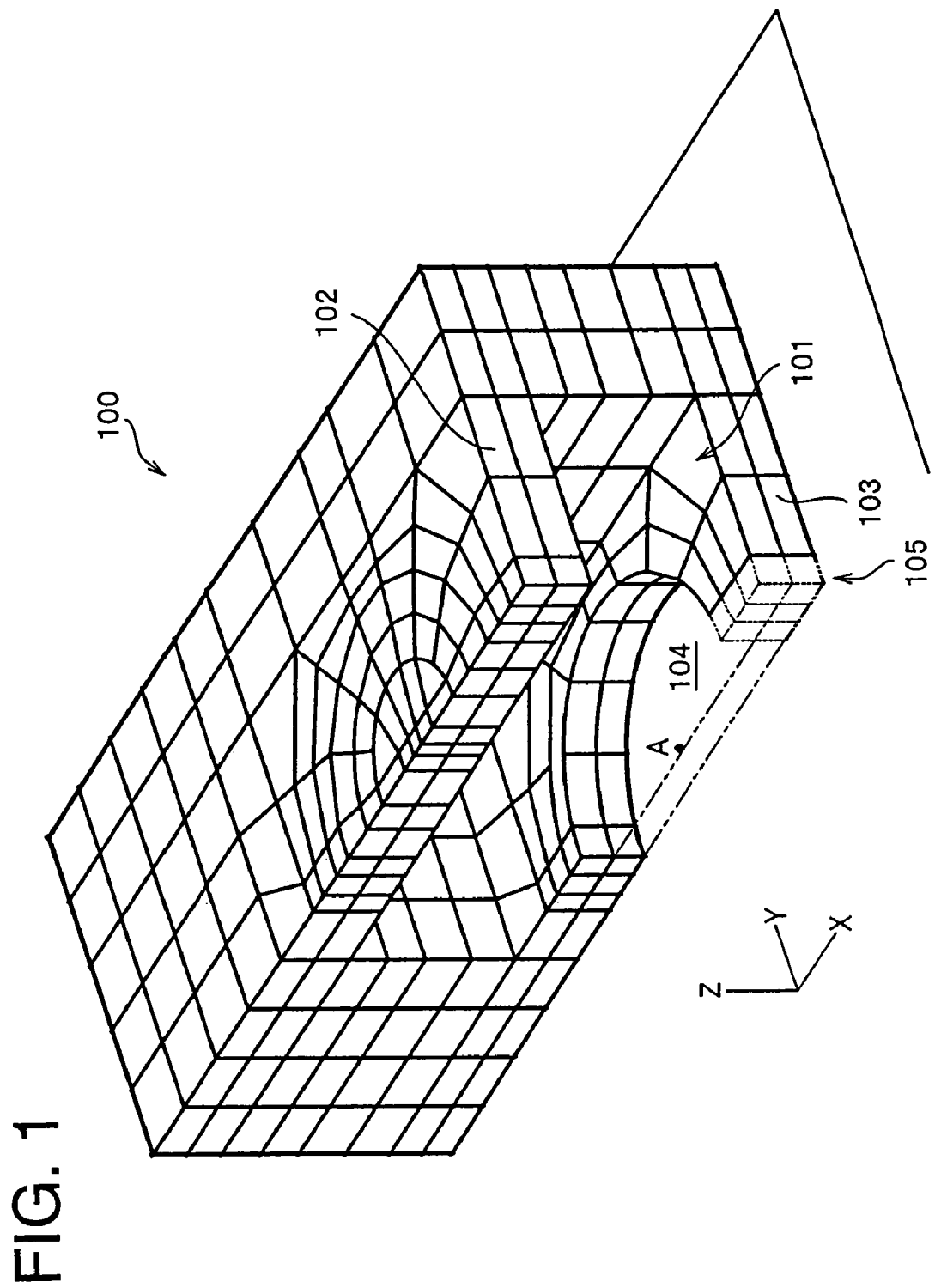
FIG. 1 It is a perspective view schematically showing a half portion of a metallic test piece according to a first embodiment of the present invention.
Figure 2:
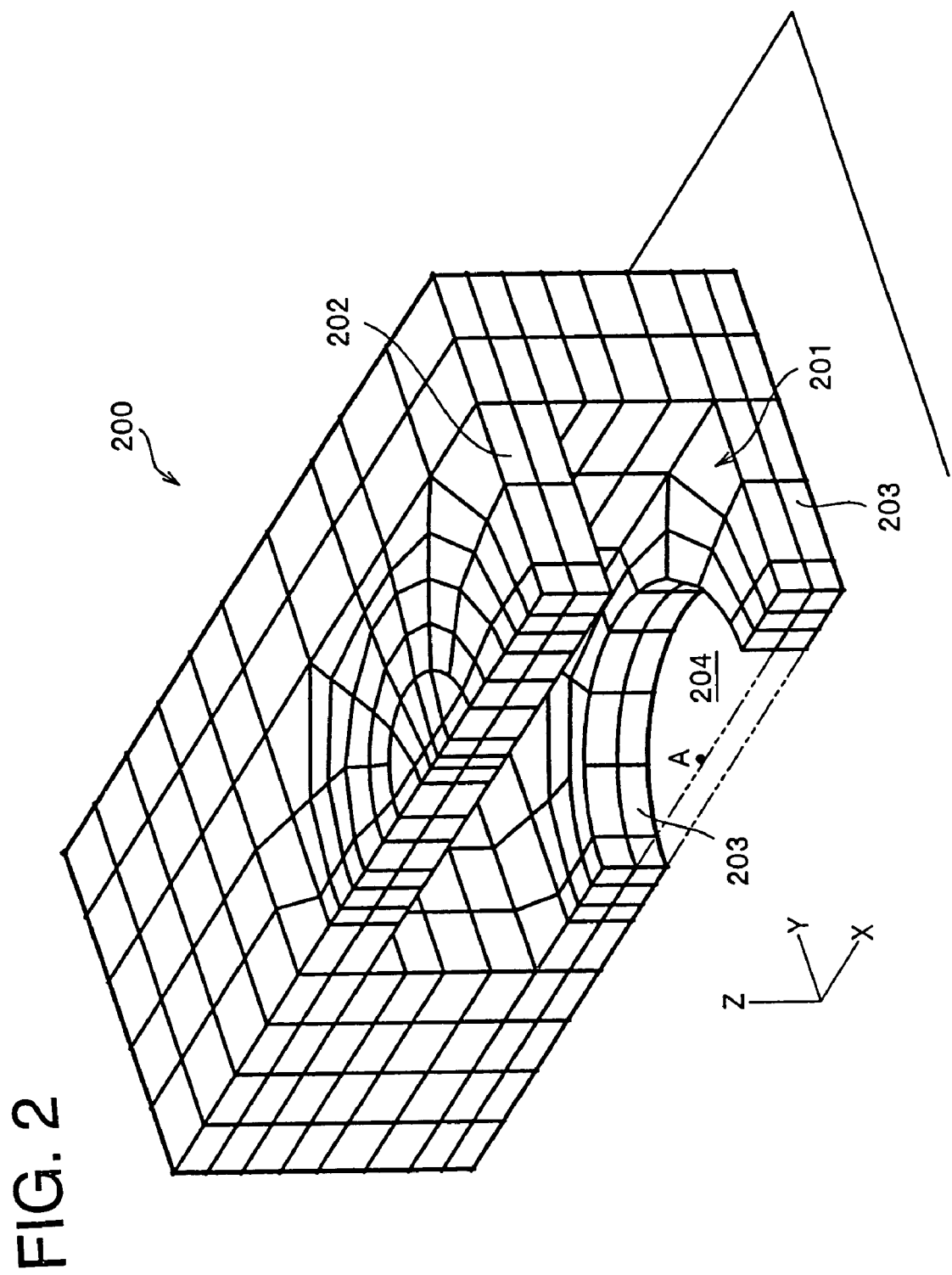
FIG. 2 It is a perspective view schematically showing a half portion of a metallic test piece having a general shape.
Figure 3:
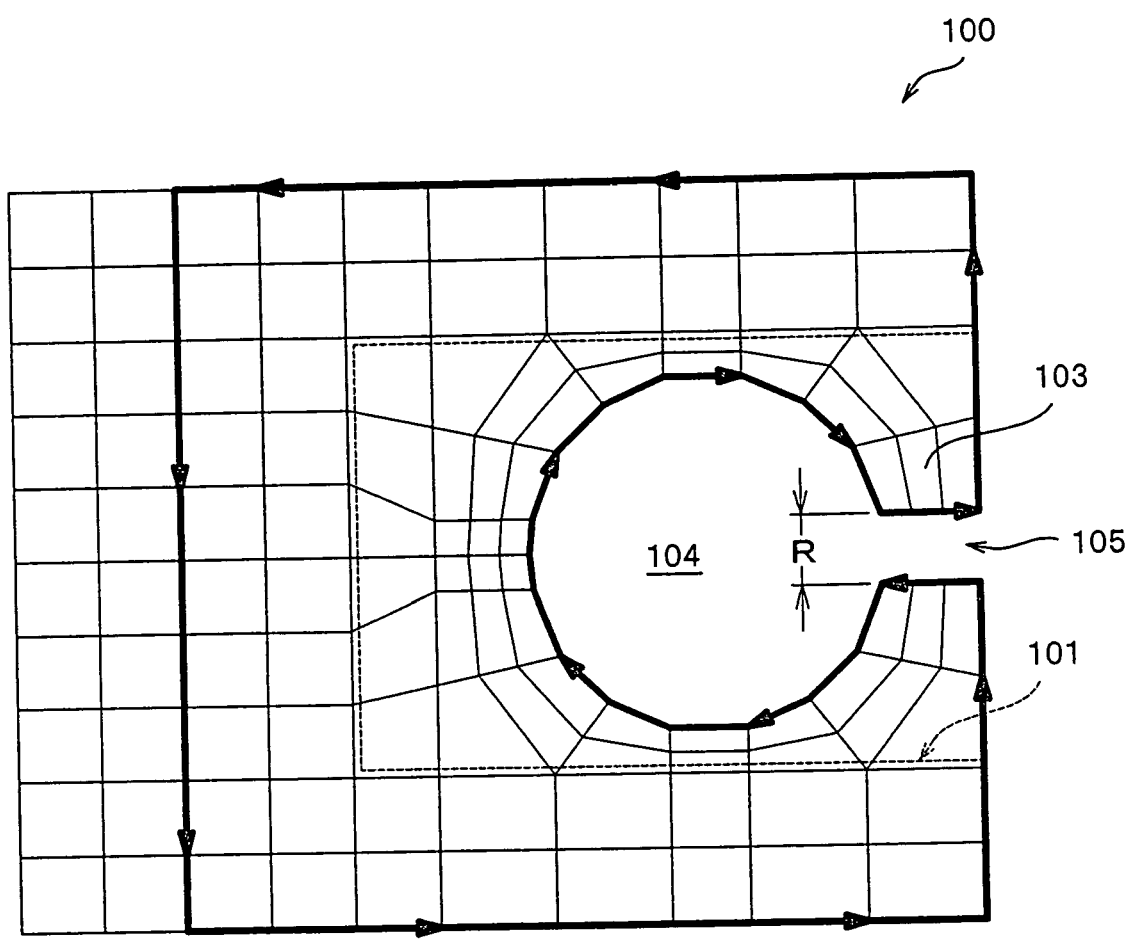
FIG. 3 It is a plan view showing a direction and a location of an induced current flowing on a surface of the test piece shown in FIG. 1.
Figure 4:
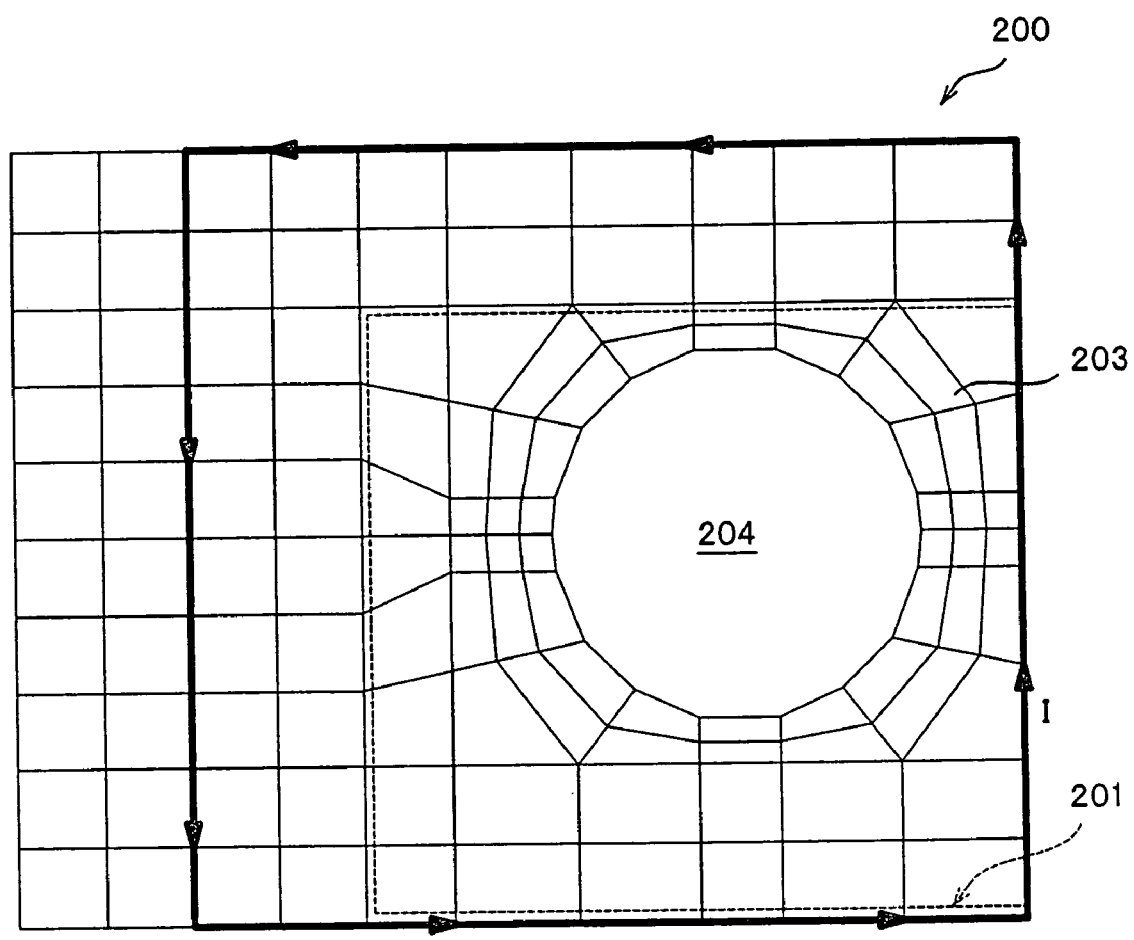
FIG. 4 It is a plan view showing a direction and a location of an induced current flowing on a surface of a test piece shown in FIG. 2.
Figure 5:
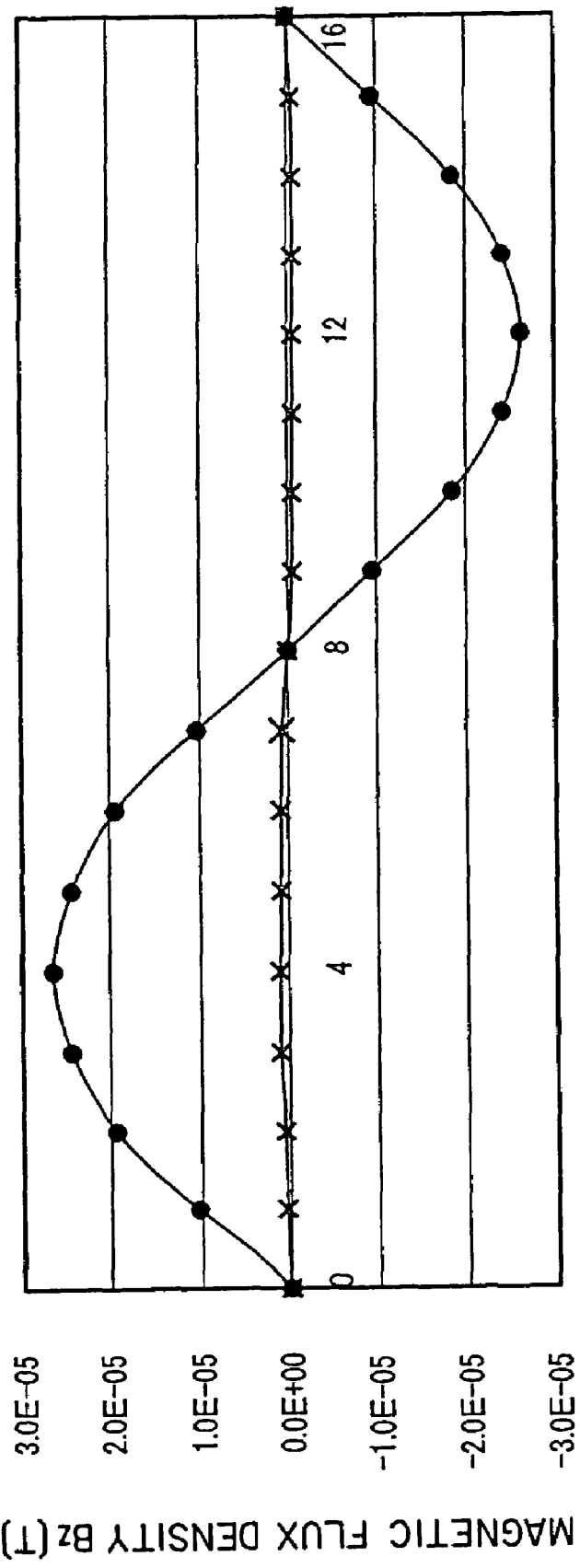
FIG. 5 It is an explanatory diagram showing changes of magnetic flux density in a vertical direction (Z-axis direction) at a point A shown in FIGS. 1 and 2 by an electromagnetic wave of a cycle.
Figure 6:
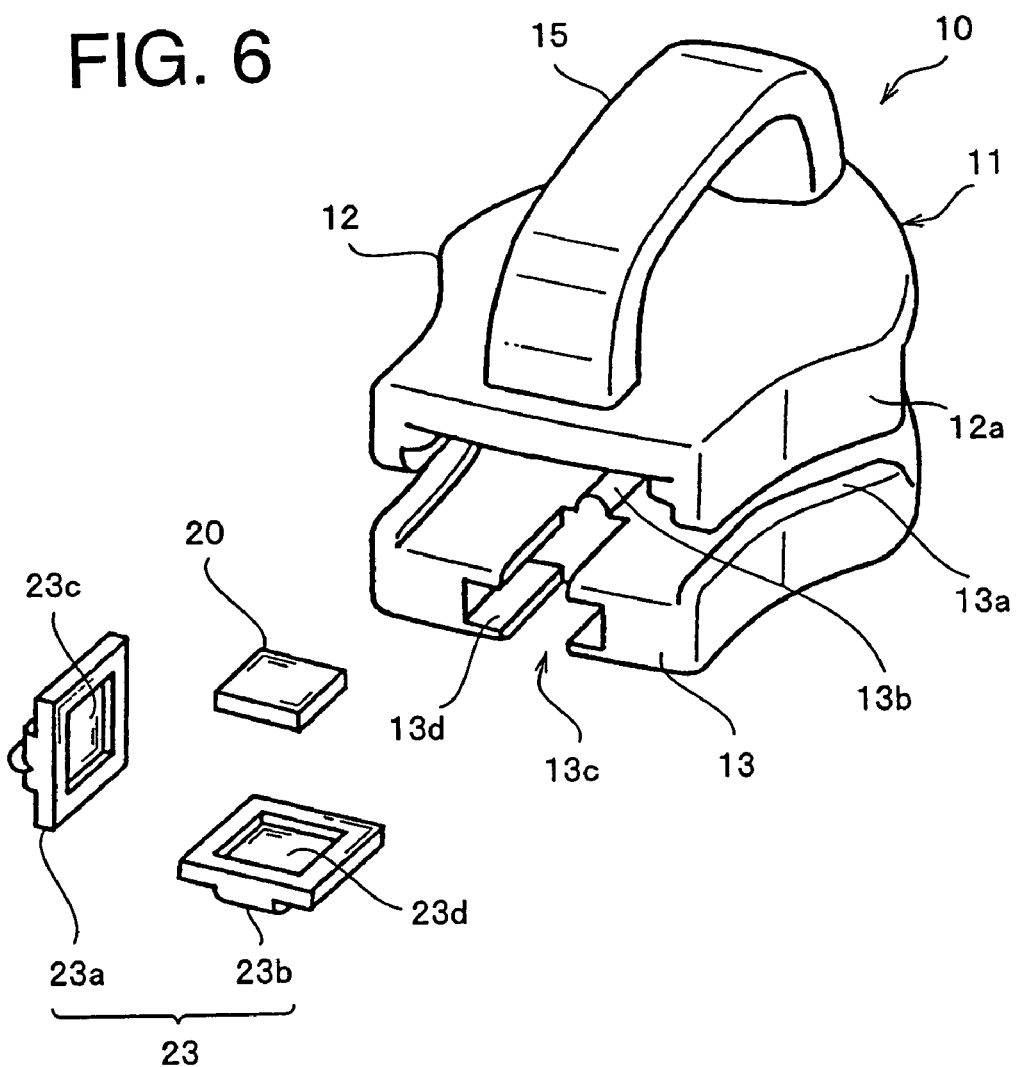
FIG. 6 It is an exploded perspective view of a slider for a slide fastener for mounting and holding a passive type RFID according to a second embodiment of the present invention.
Figure 7:
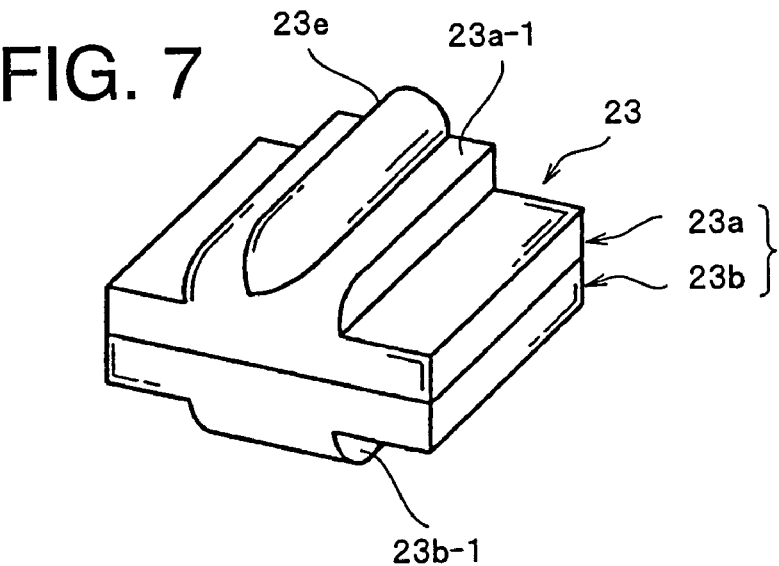
FIG. 7 It is a perspective view showing an accommodating member for the passive type RFID of the same embodiment.
Figure 8:
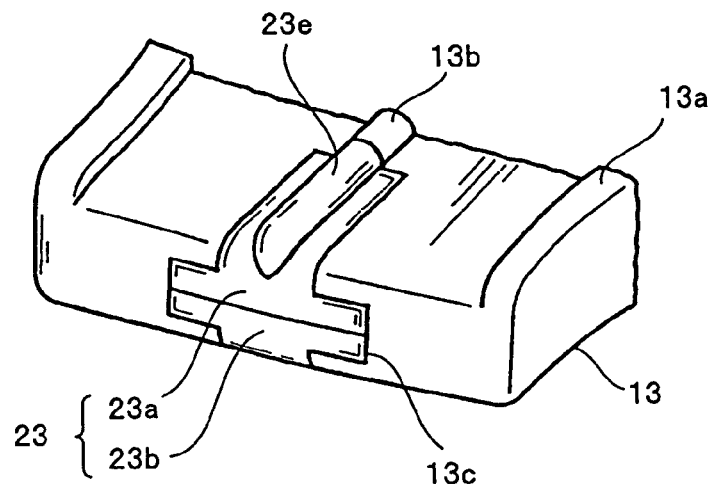
FIG. 8 It is a partial perspective view of a lower plate rear end portion of a slider indicating a mounting and holding style of the same accommodating member.
Figure 9:
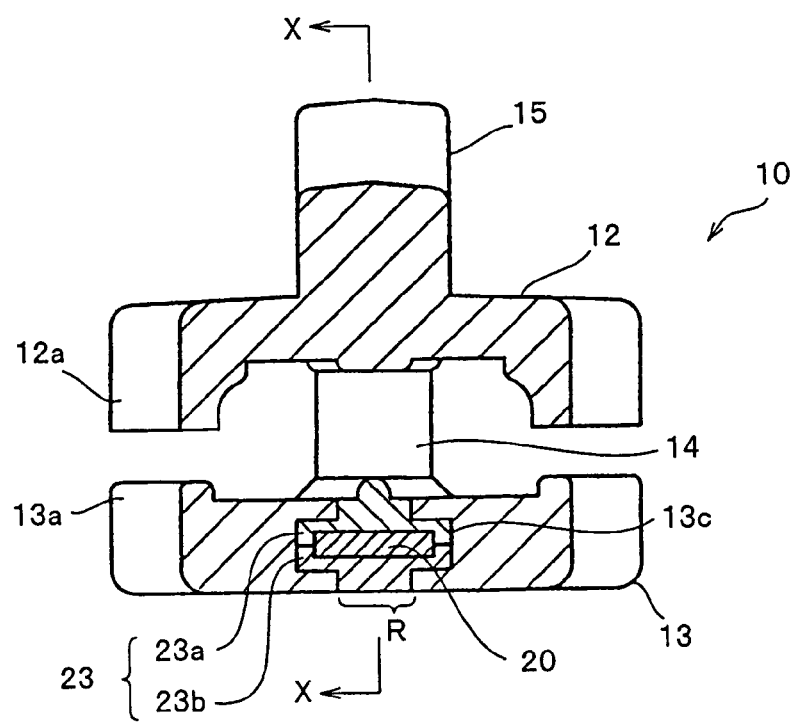
FIG. 9 It is a sectional view seen in a direction of arrow along a line IX-IX of FIG. 10.
Figure 10:
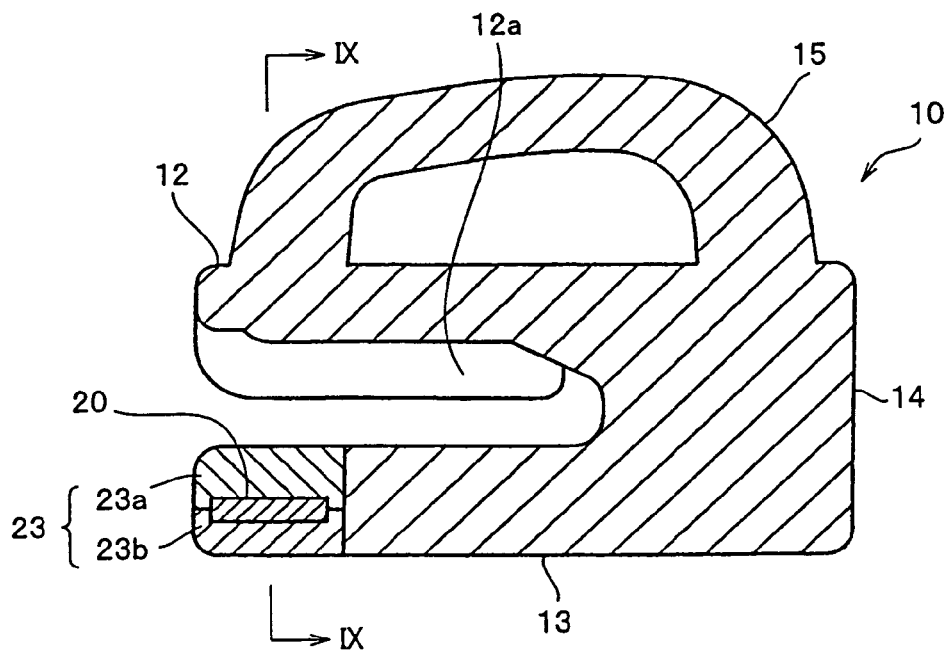
FIG. 10 It is a sectional view seen in a direction of arrow along the line X-X of FIG. 9.
Figure 11:
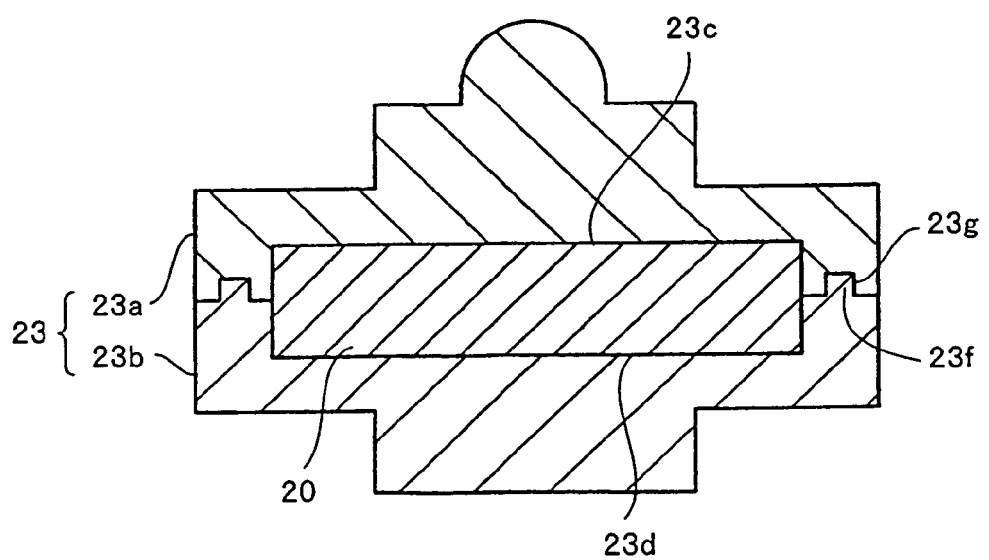
FIG. 11 It is a lateral sectional view showing a modification of the accommodating member incorporating the passive type RFID.
Figure 12:
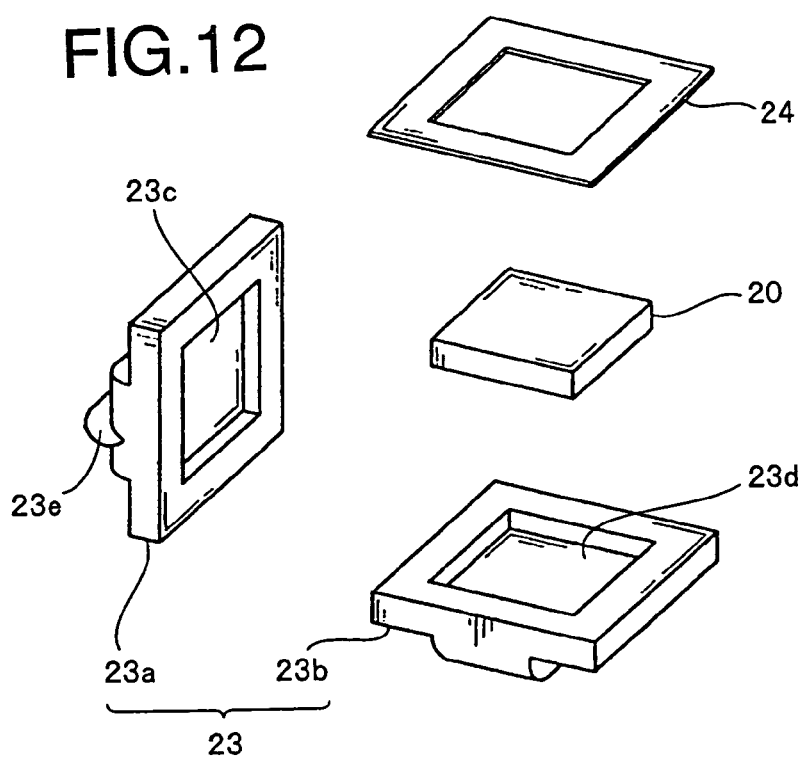
FIG. 12 It is an exploded perspective view showing another modification of the accommodating member incorporating the passive type RFID.
Figure 13:
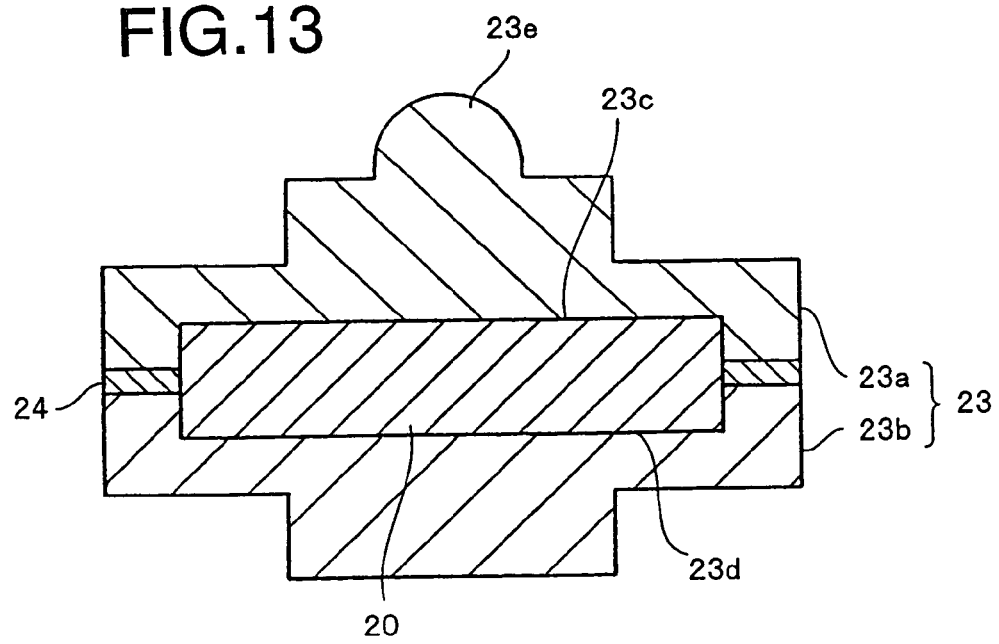
FIG. 13 It is a lateral sectional view showing still another modification of the accommodating member incorporating the passive type RFID.
Figure 14:
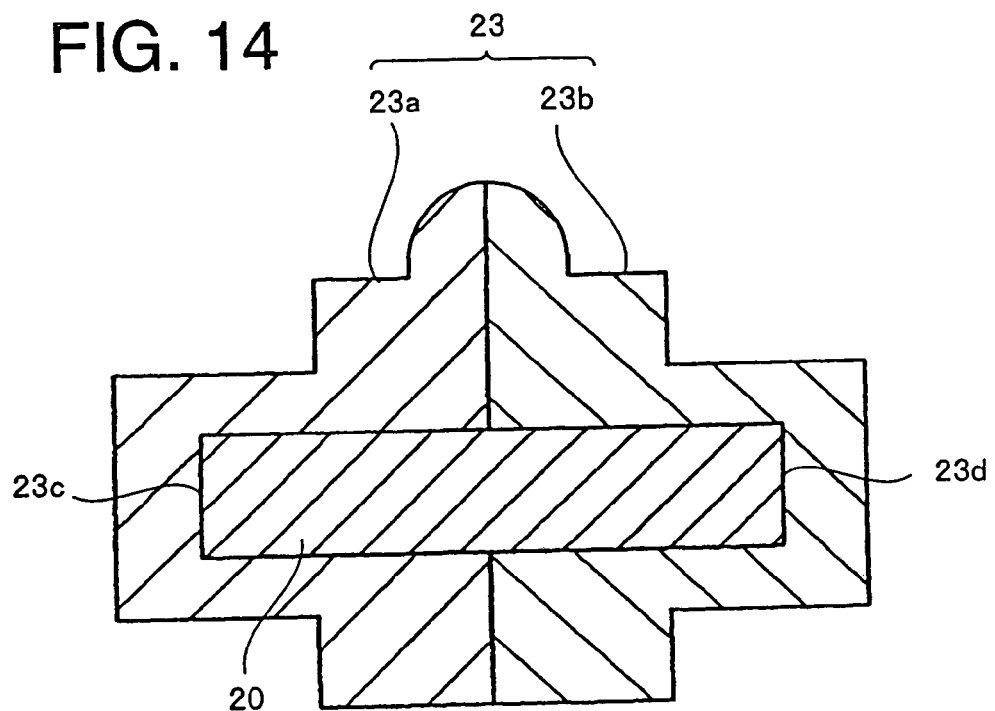
FIG. 14 It is a lateral sectional view showing still another modification of the accommodating member incorporating the passive type RFID.
Figure 15:
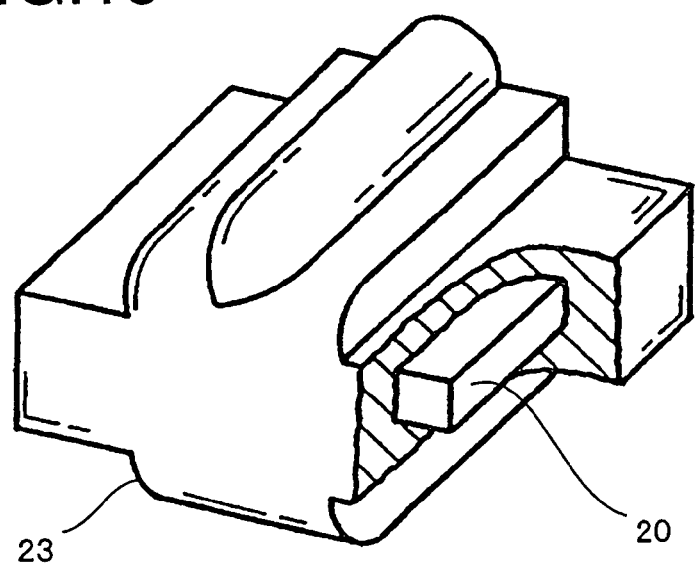
FIG. 15 It is a partially broken perspective view showing still another modification of the accommodating member incorporating the passive type RFID.
Figure 16:
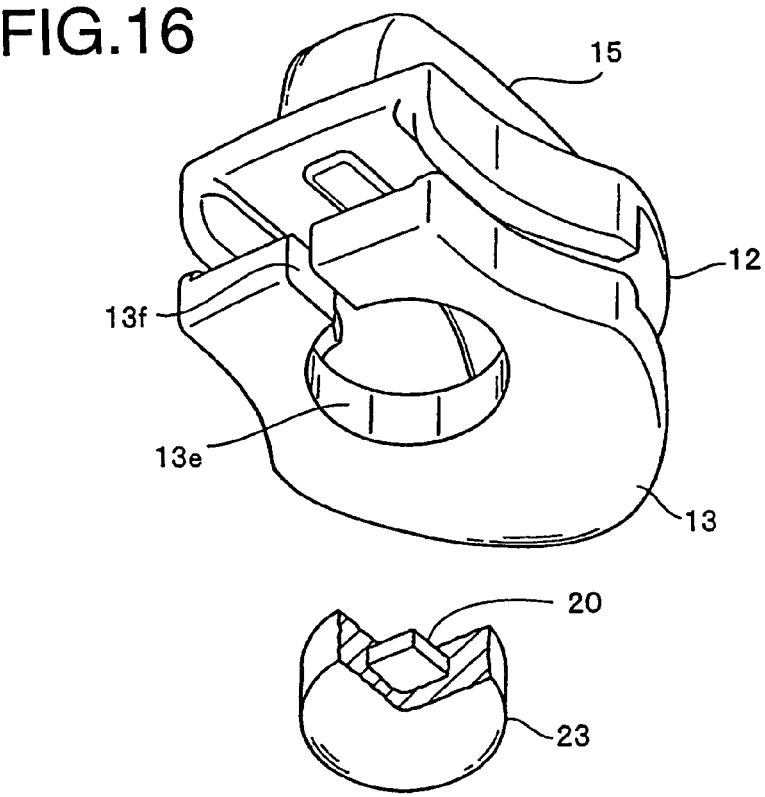
FIG. 16 It is an exploded perspective view of a slider for a slide fastener for mounting and holding a passive type RFID according to a third embodiment of the present invention as seen from obliquely below.
Figure 17:
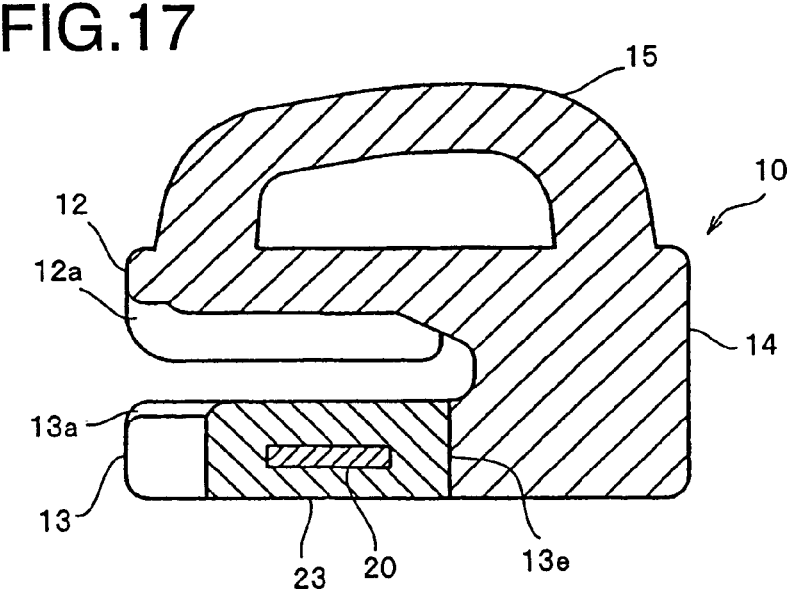
FIG. 17 It is a longitudinal sectional view of the same slider.
Figure 18:
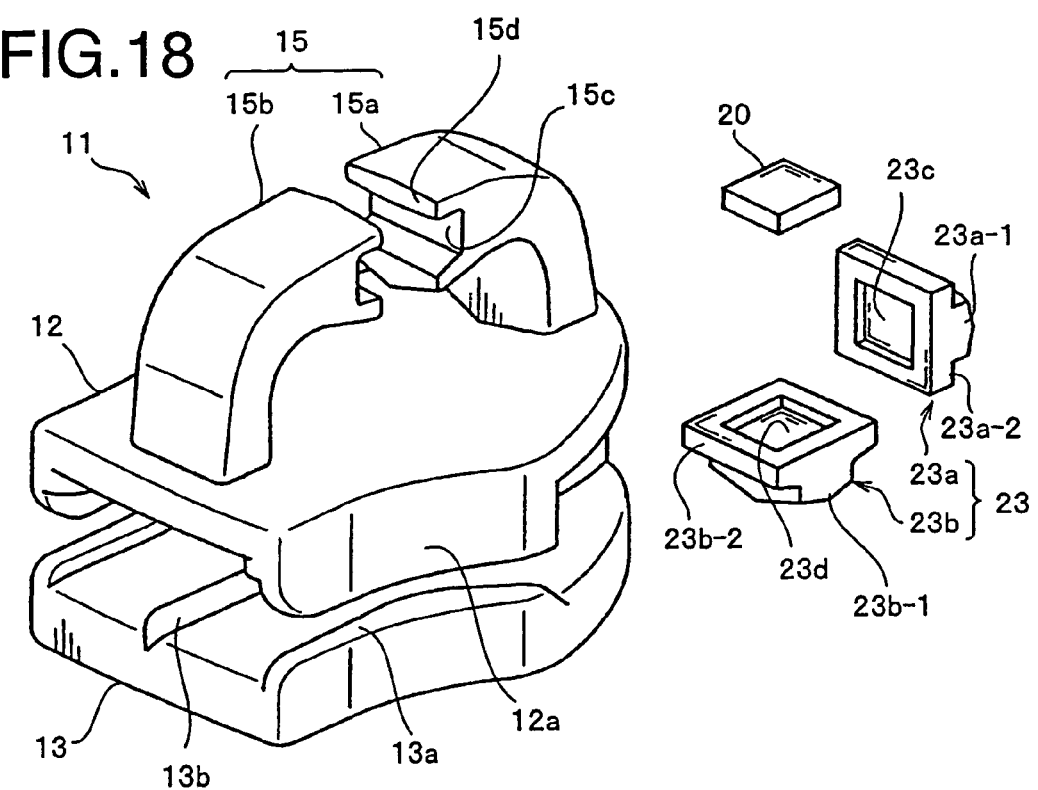
FIG. 18 It is an exploded perspective view of a slider for a slide fastener for mounting and holding a passive type RFID according to a fourth embodiment of the present invention.
Figure 19:
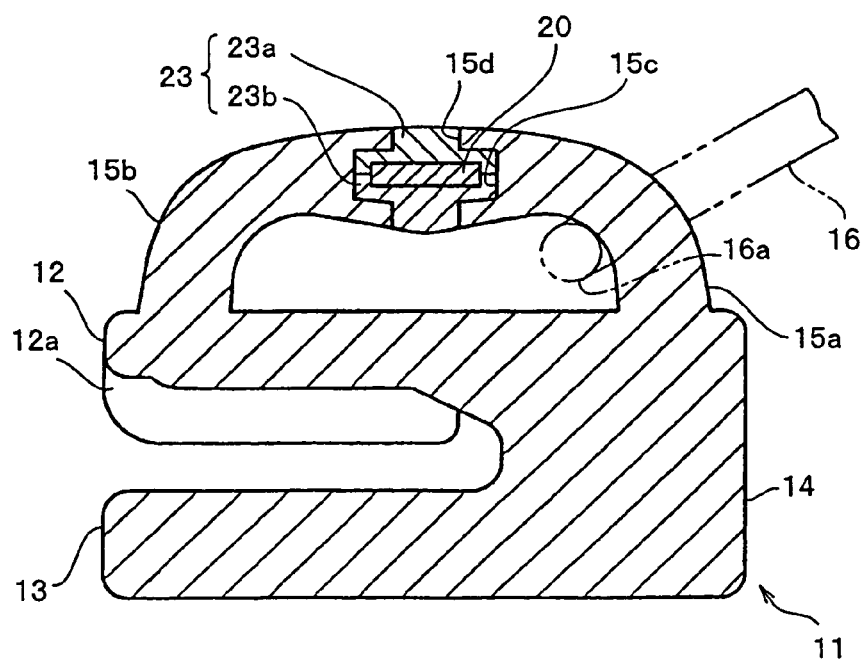
FIG. 19 It is a longitudinal sectional view of the same slider.
Figure 20:
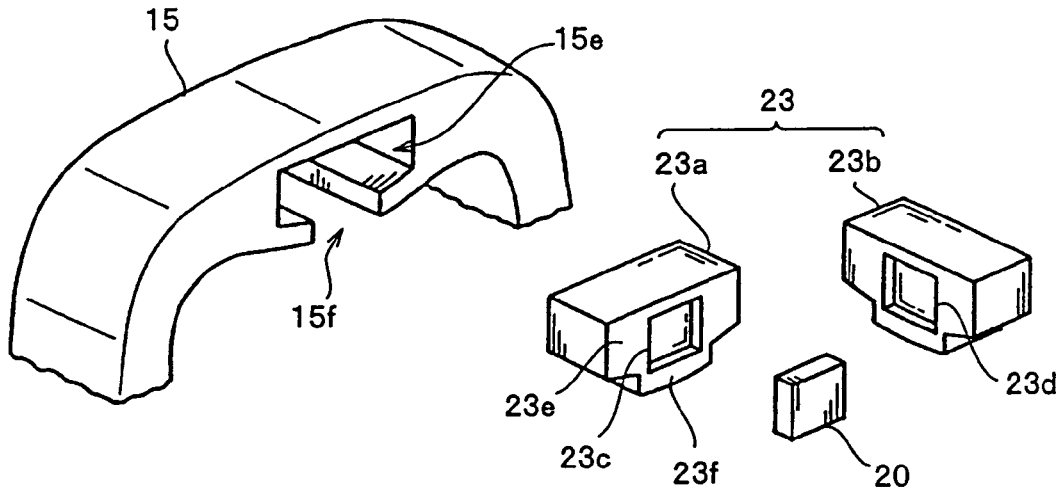
FIG. 20 It is a partial exploded view showing a modification of a pull tab attaching post of the same slider.
Figure 21:
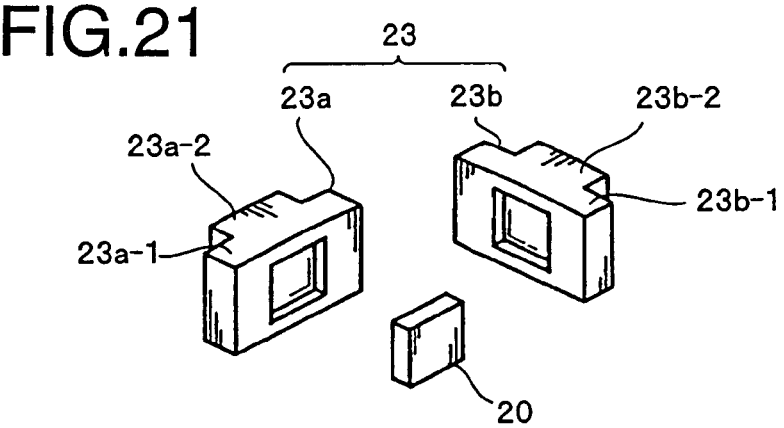
FIG. 21 It is a partial exploded view showing another modification of the pull tab attaching post.
Figure 21:
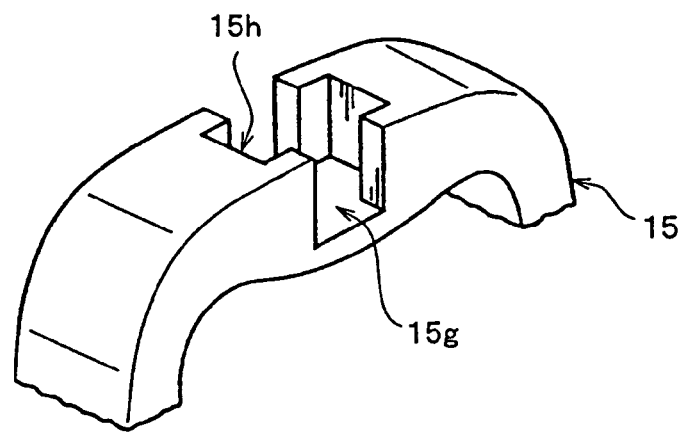
Figure 22:
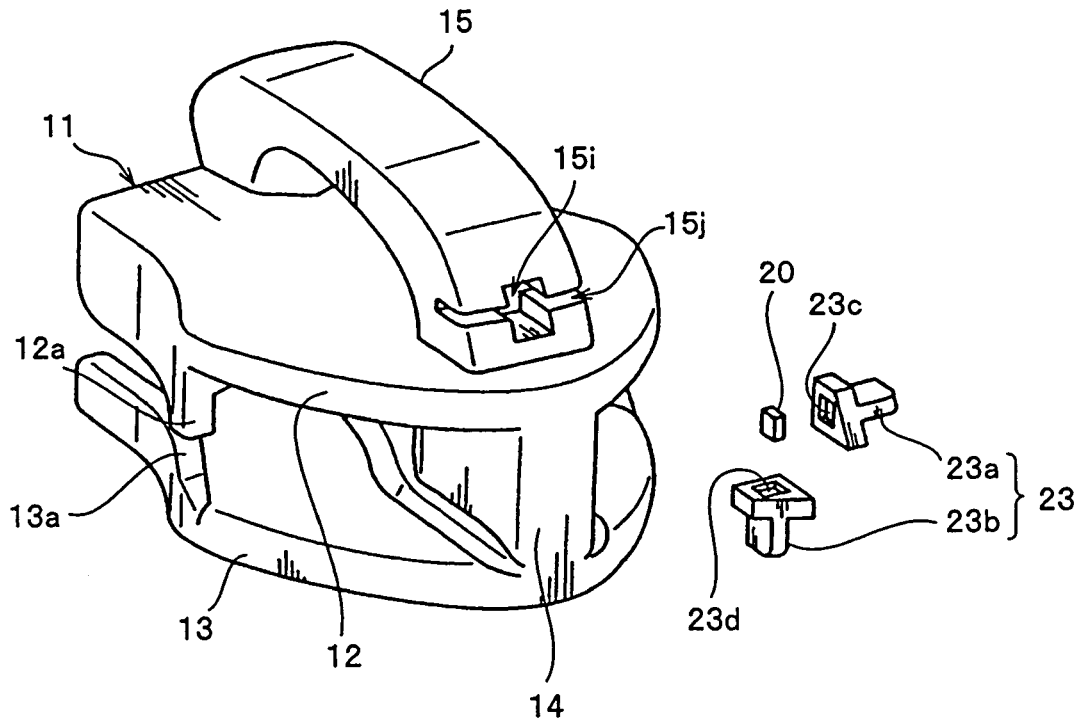
FIG. 22 It is an exploded perspective view of a slider according to a further modification of the pull tab attaching post.
Figure 23:
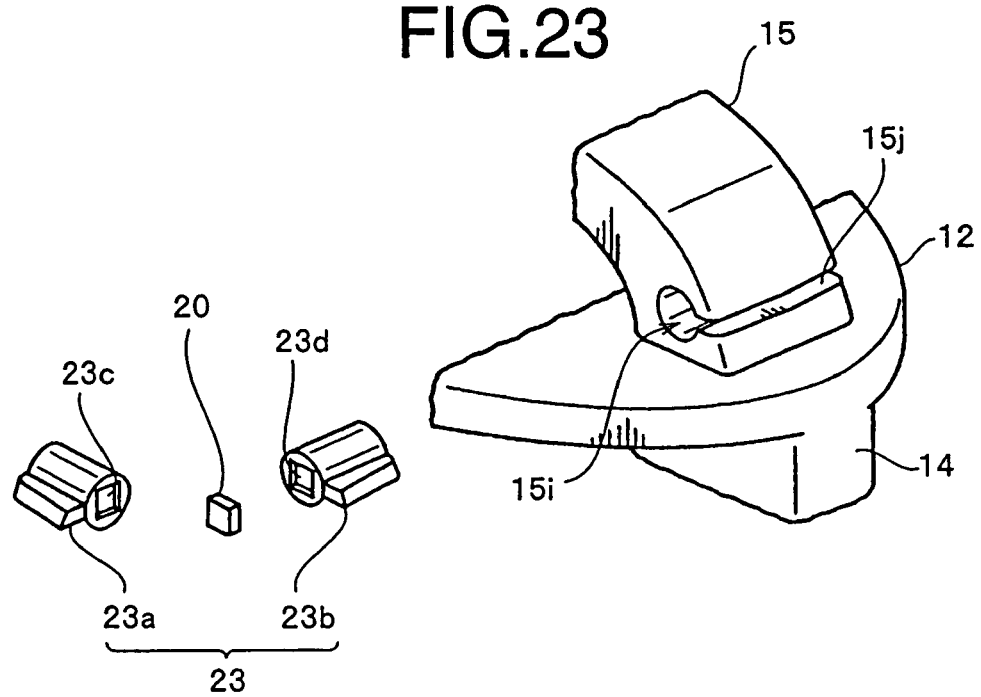
FIG. 23 It is a partial exploded perspective view showing a further modification of the pull tab attaching post.
Figure 24:
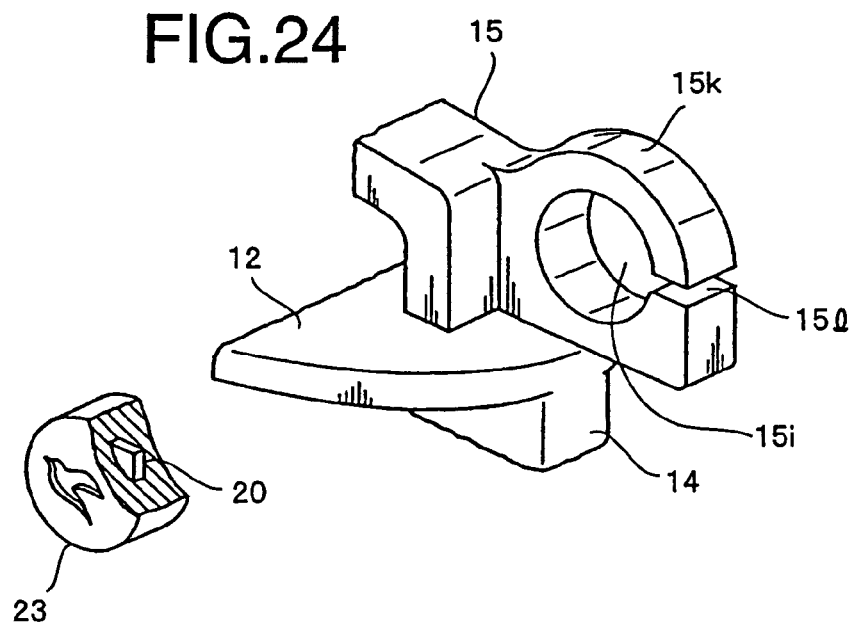
FIG. 24 It is a partial exploded perspective view showing a further modification of the pull tab attaching post.
Figure 25:
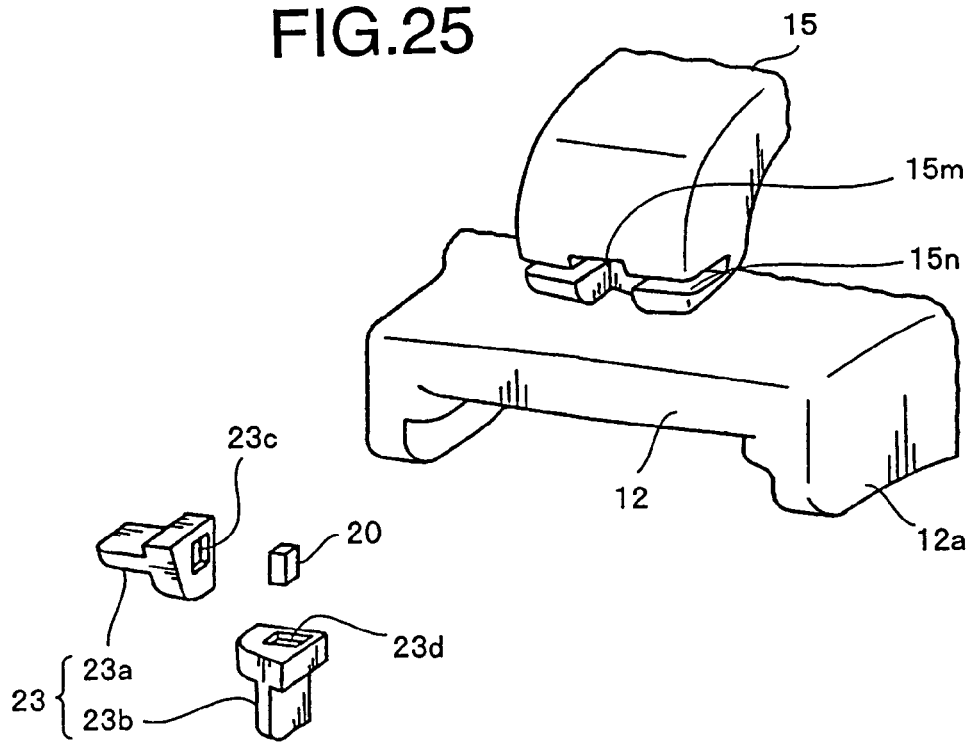
FIG. 25 It is a partial exploded perspective view showing a further modification of the pull tab attaching post.
Figure 26:
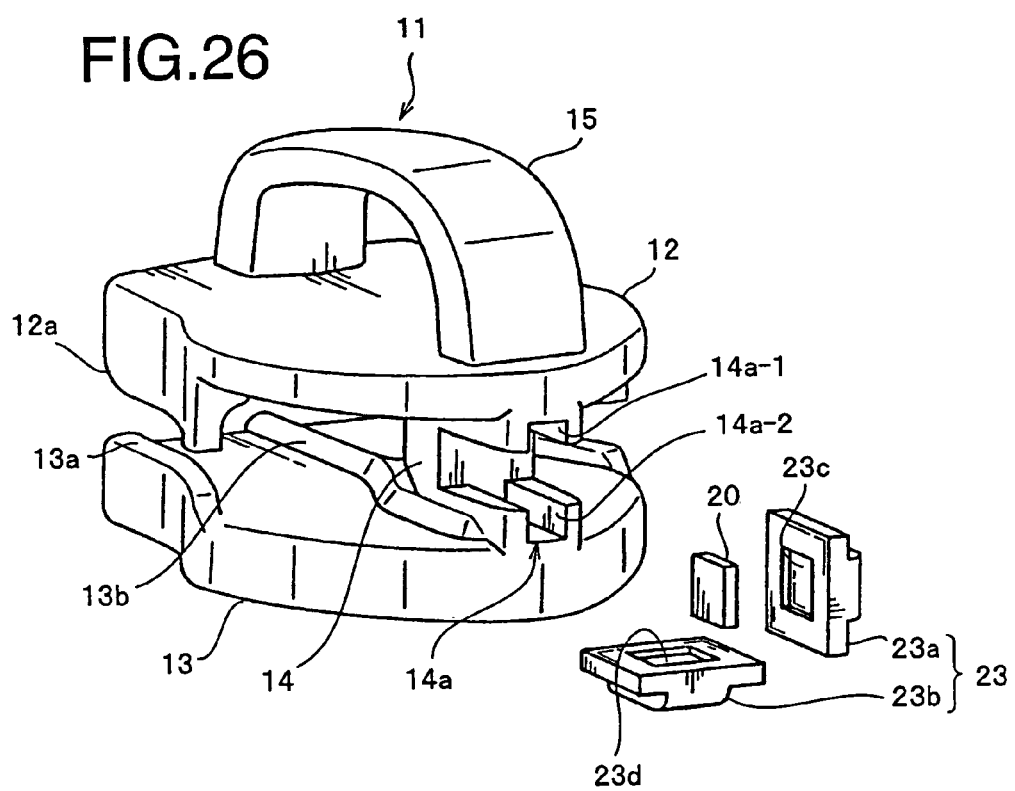
FIG. 26 It is an exploded perspective view of a slider for a slide fastener for mounting and holding a passive type RFID according to a fifth embodiment of the present invention as seen from obliquely forward.
Figure 27:
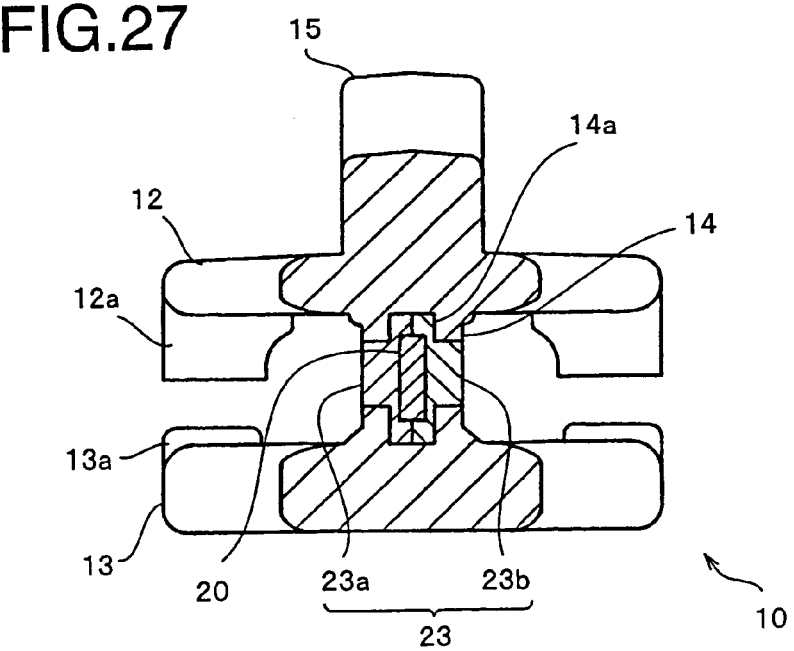
FIG. 27 It is a lateral sectional view including a mounting portion of the passive type RFID.
Figure 28:
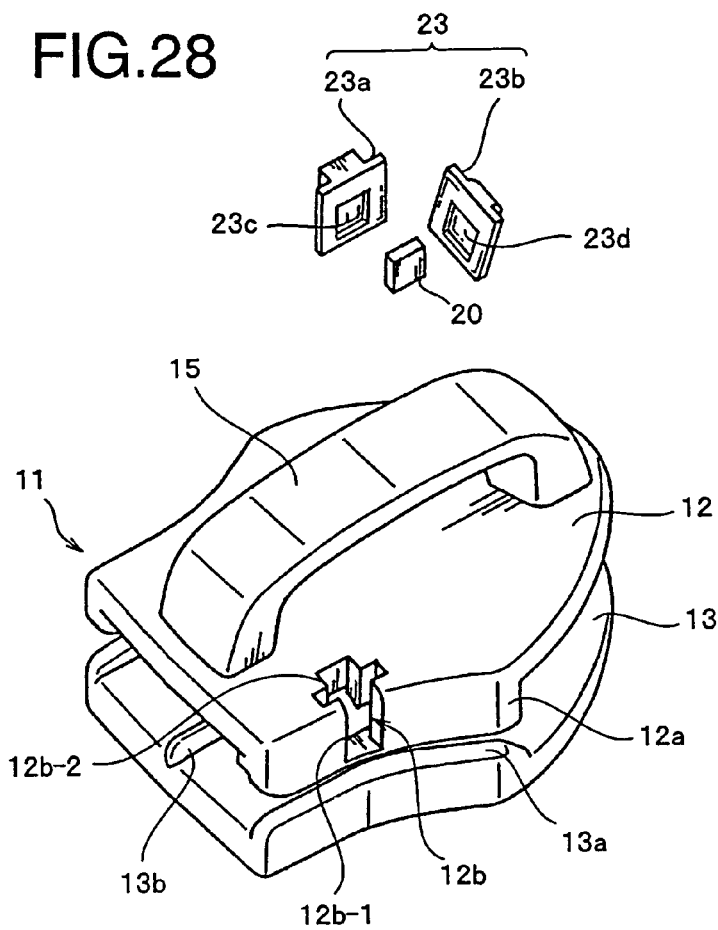
FIG. 28 It is an exploded perspective view of a slider for a slide fastener for mounting and holding a passive type RFID according to a sixth embodiment of the present invention as seen from obliquely above.
Figure 29:
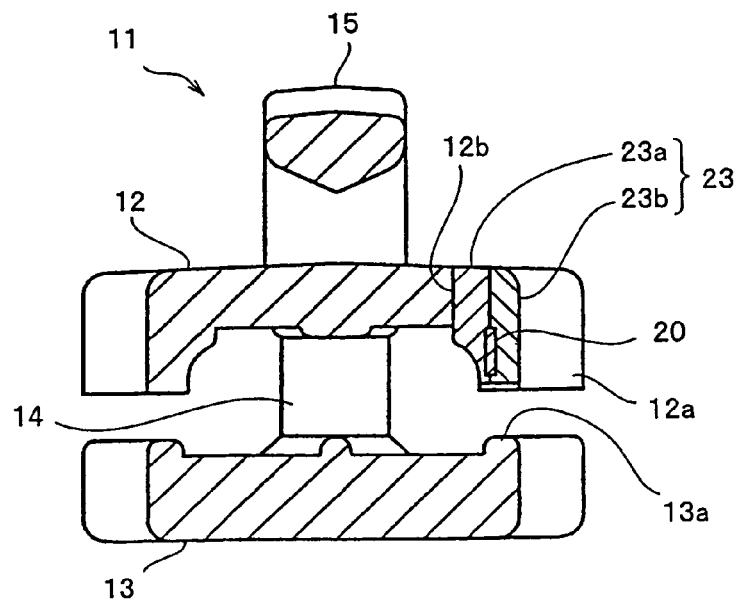
FIG. 29 It is a lateral sectional view including a mounting portion of the passive type RFID.
Figure 30:
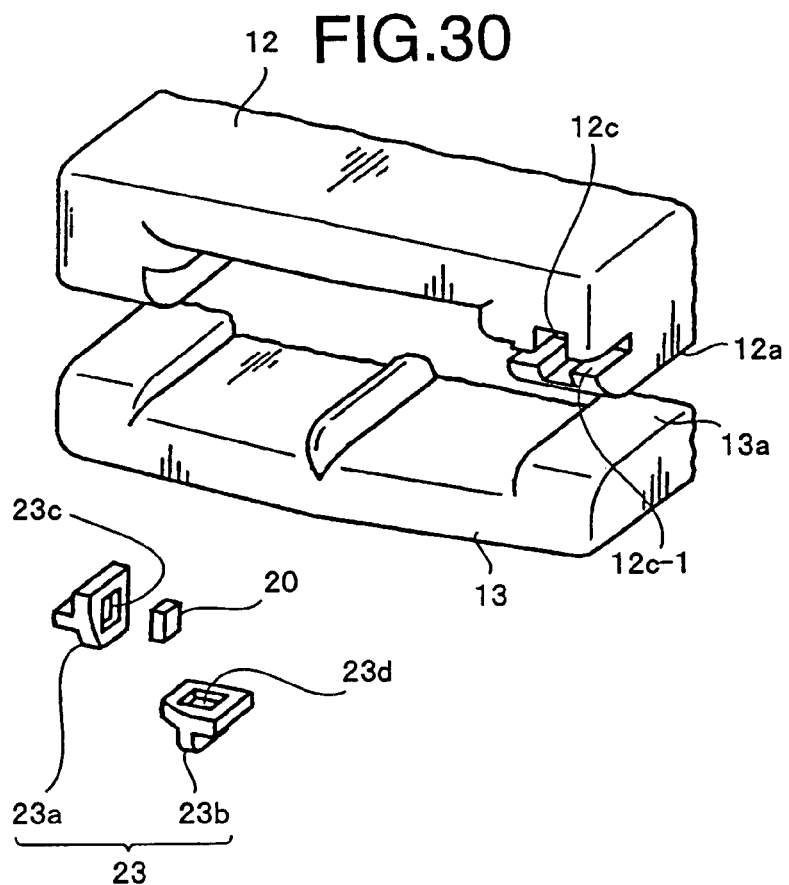
FIG. 30 It is a partial exploded perspective view of a slider body according to a modification of the embodiment as seen from a rear mouth side of a slider body.
Figure 31:
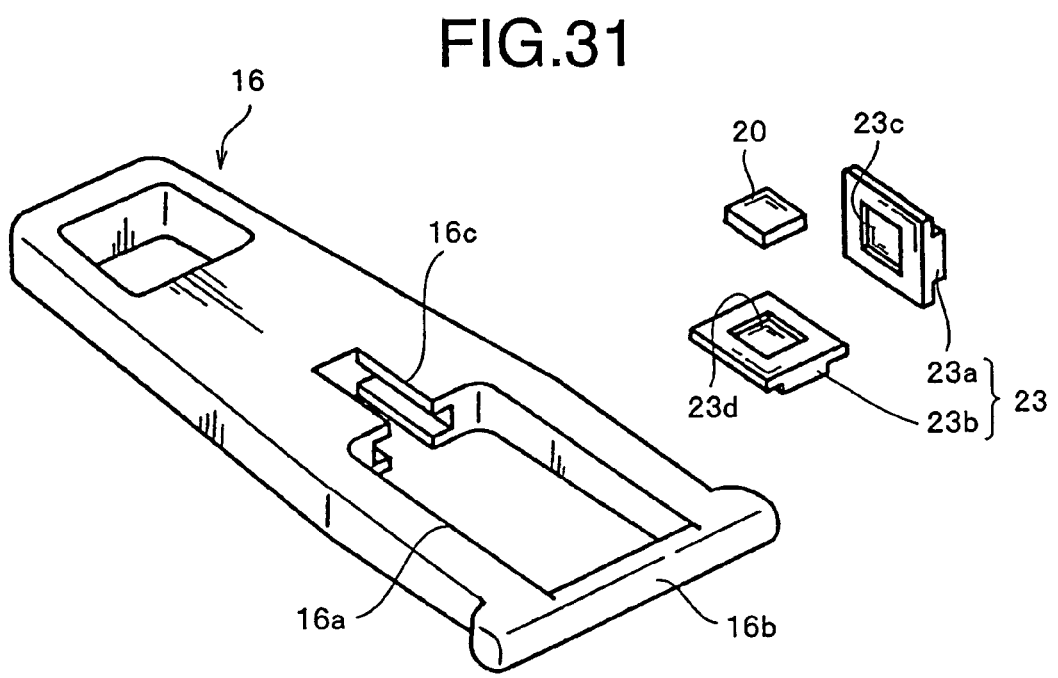
FIG. 31 It is an exploded perspective view of a pull tab of a slider for a slide fastener for mounting and holding a passive type RFID according to a seventh embodiment of the present invention.
Figure 32:
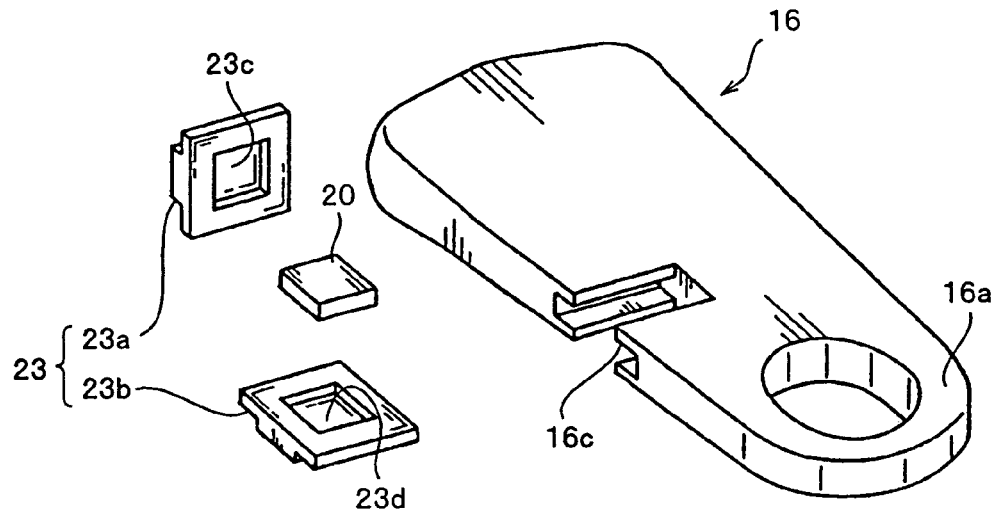
FIG. 32 It is an exploded perspective view showing a modification of the pull tab.
Figure 33:
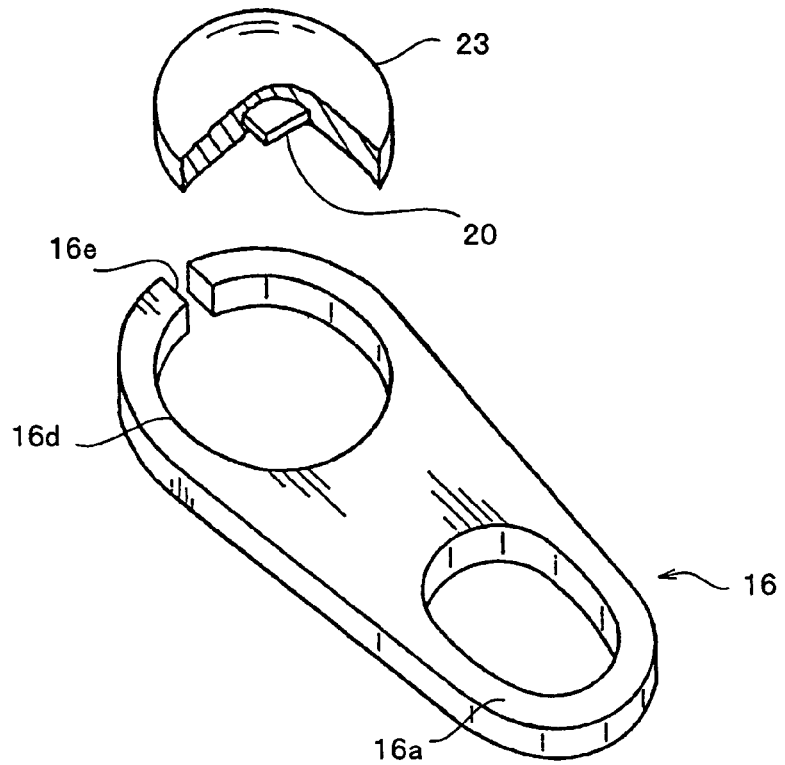
FIG. 33 It is an exploded perspective view of another modification of the pull tab with an accommodating portion partly broken.
Figure 34:
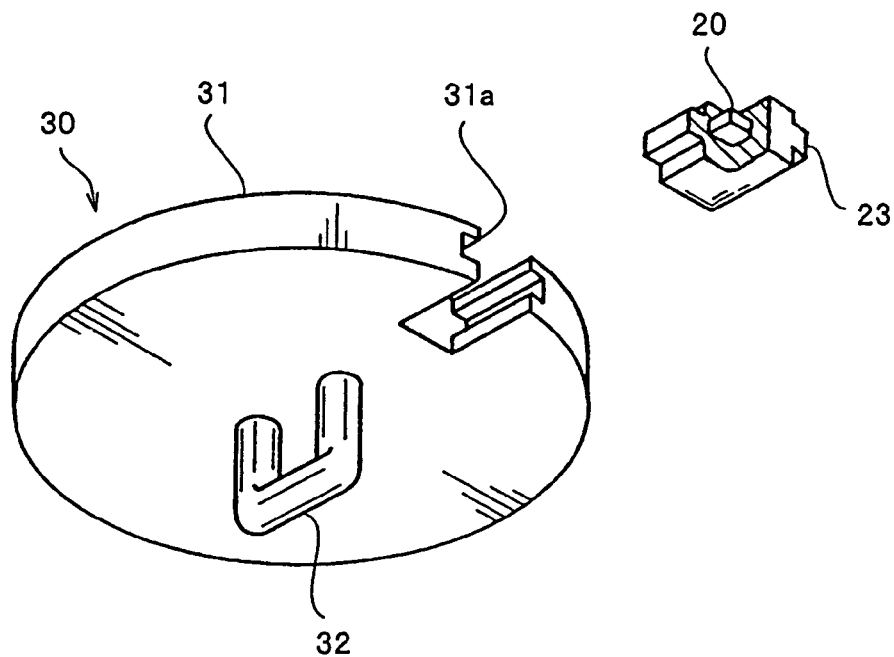
FIG. 34 It is an exploded perspective view of a button for mounting and holding a passive type RFID according to an eighth embodiment of the present invention as seen from obliquely below.
Figure 35:
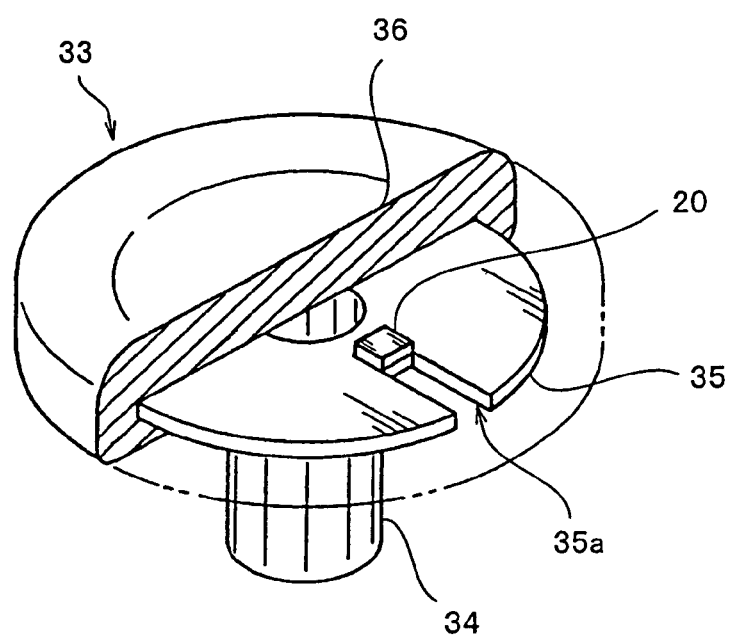
FIG. 35 It is an exploded perspective view of a button for mounting and holding a passive type RFID according to a ninth embodiment of the present invention in a state in which the button is partly broken, as seen from obliquely above.
Figure 36:
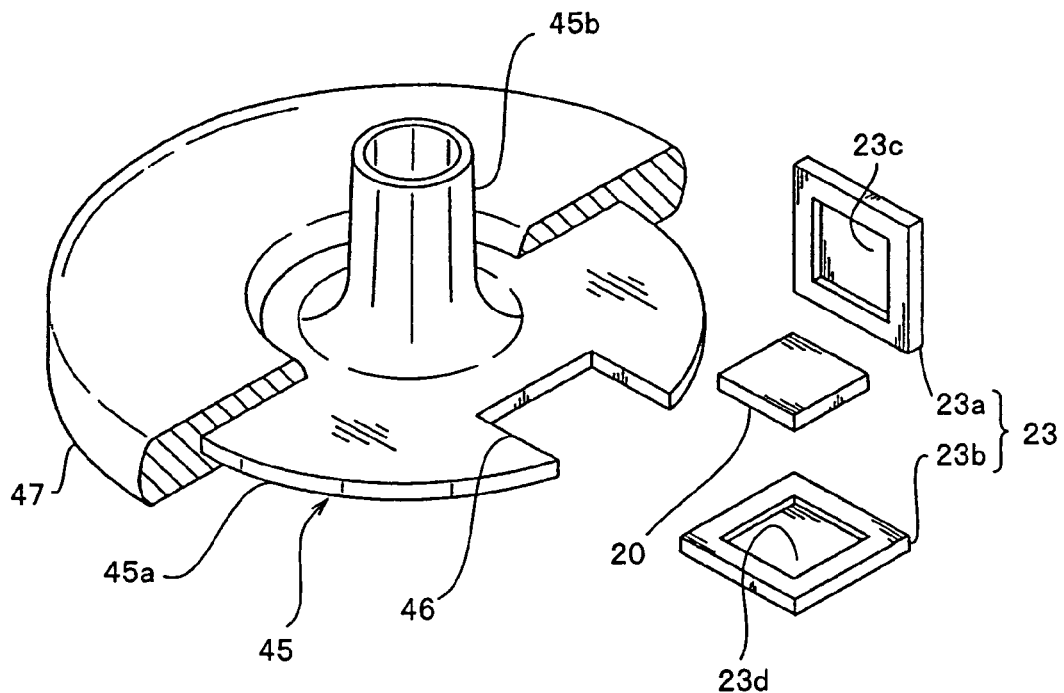
FIG. 36 It is an exploded perspective view of a button for mounting and holding a passive type RFID according to a tenth embodiment of the present invention with its eyelet partly broken, as seen from obliquely above.
Figure 37:
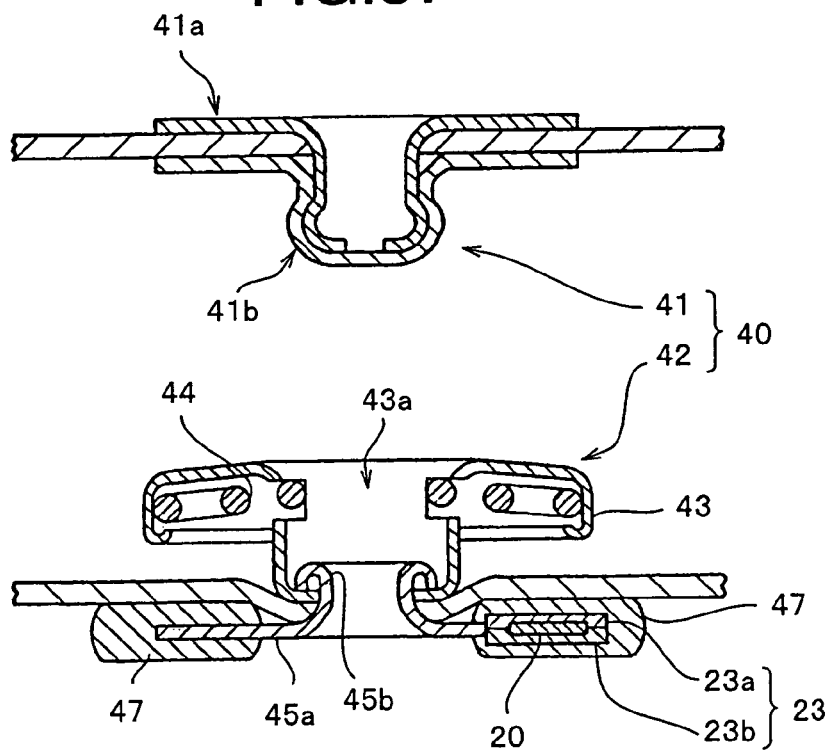
FIG. 37 It is a sectional view of male and female members of a snap button using the same eyelet.
Figure 38:
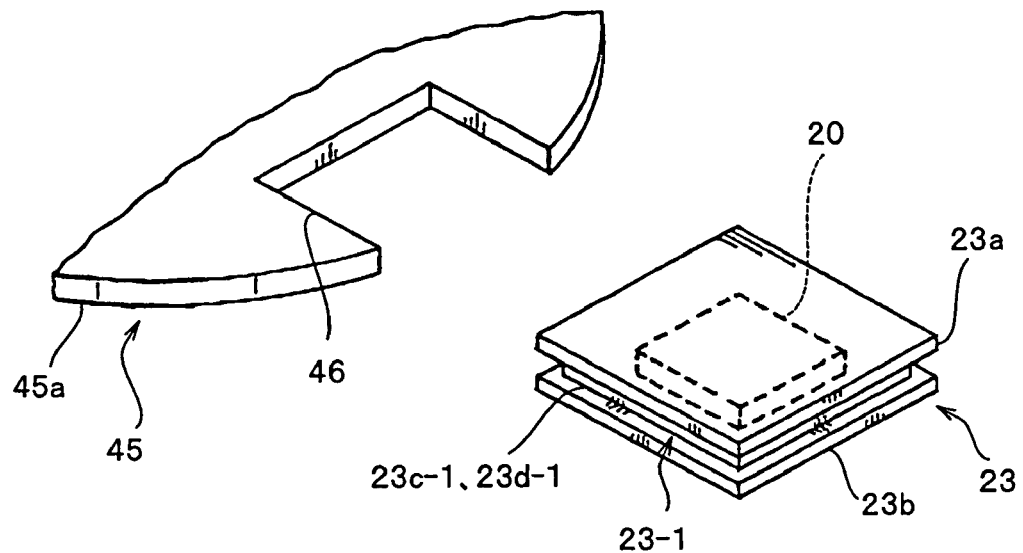
FIG. 38 It is an exploded perspective view showing major portions of a modification of the tenth embodiment partly.
Figure 39:
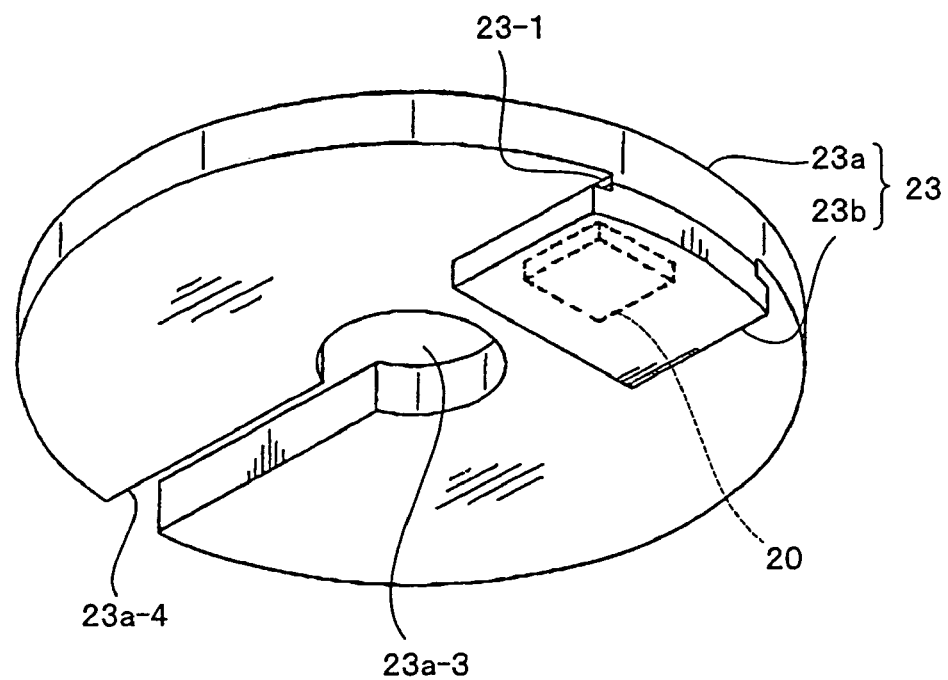
FIG. 39 It is an exploded perspective view of an accommodating member for a passive type RFID mounted on and held by a button according to an eleventh embodiment of the present invention as seen from obliquely below.
Figure 40:
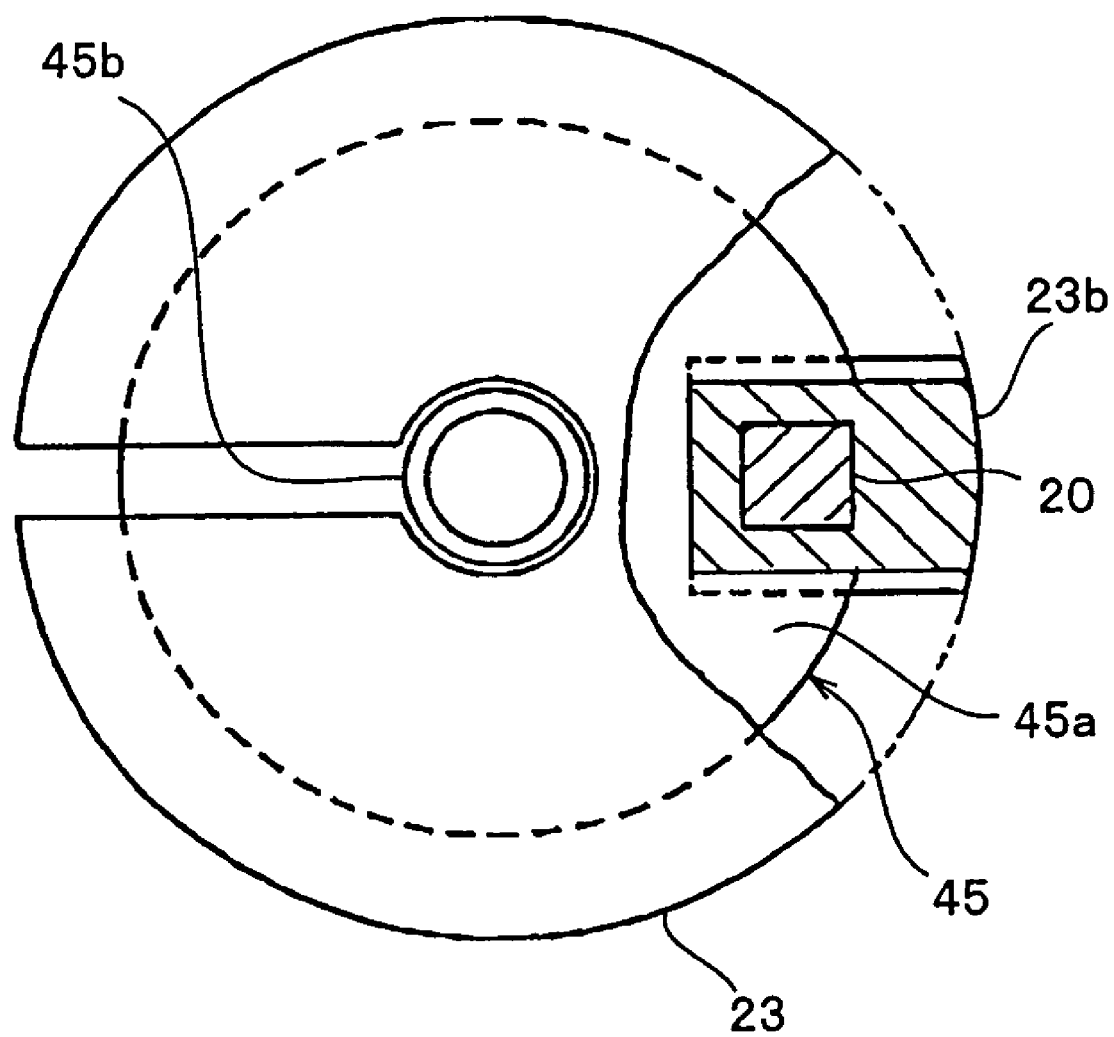
FIG. 40 It is a top view showing an eyelet mounted with the accommodating member with a part thereof broken.
Figure 41:
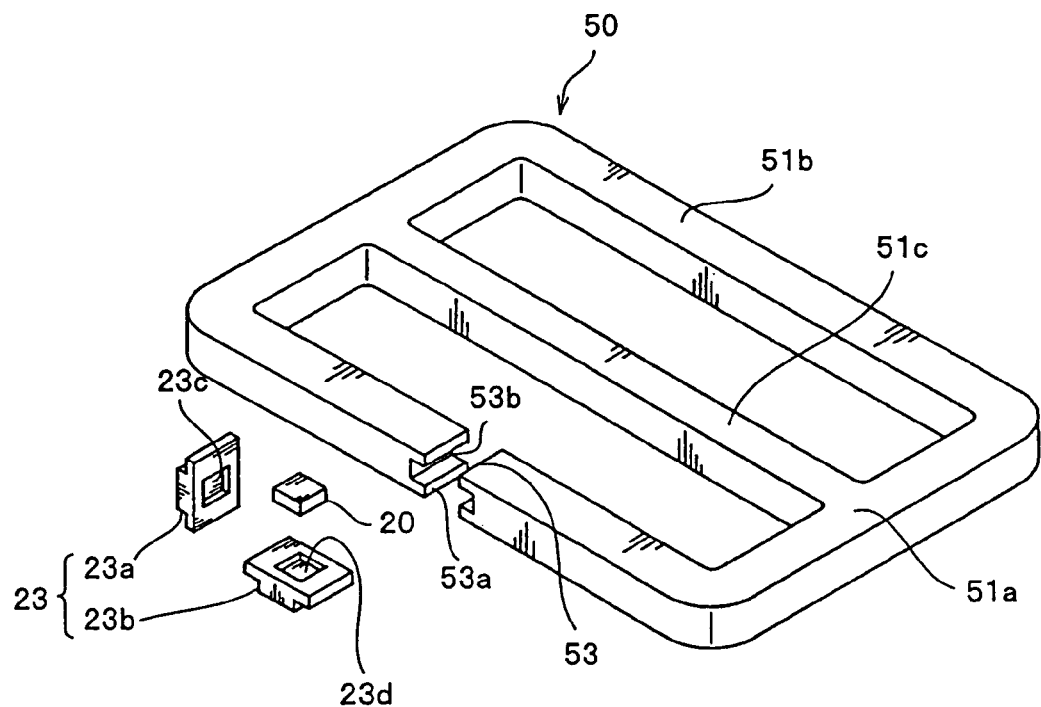
FIG. 41 It is an exploded perspective view of a belt adjuster for mounting and holding a passive type RFID according to a twelfth embodiment of the present invention.
Figure 42:
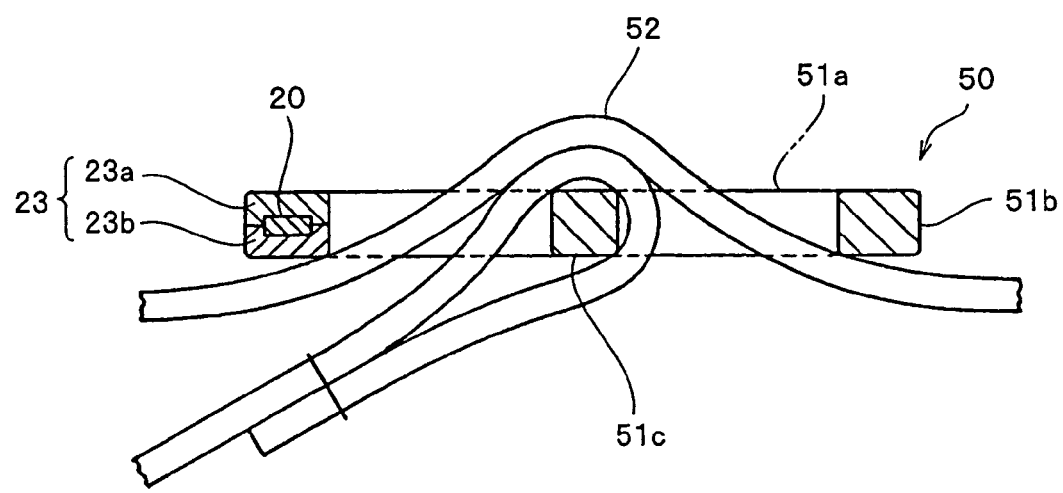
FIG. 42 It is a sectional view showing a use condition of the same adjuster.
Figure 43:
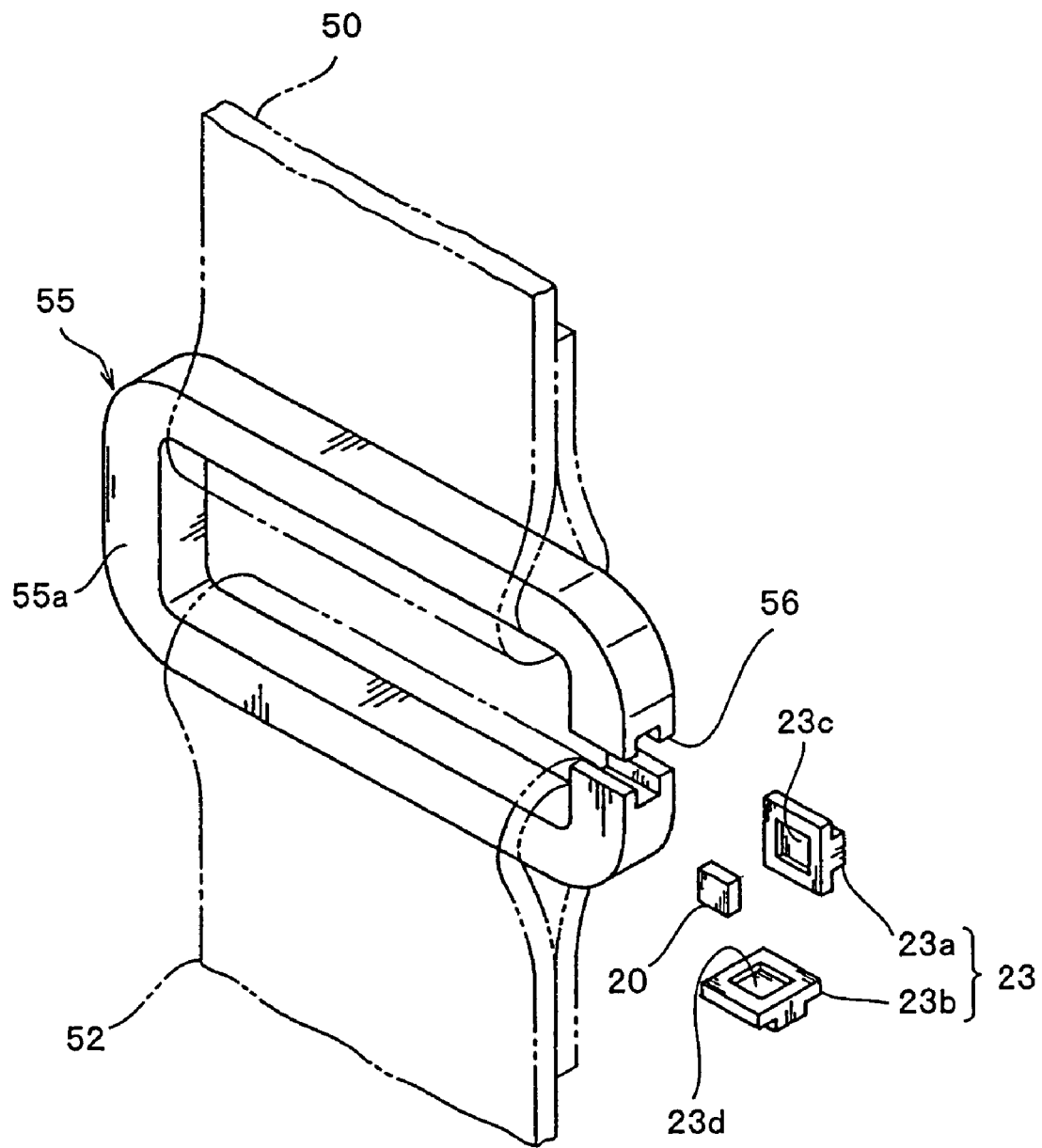
FIG. 43 It is an exploded perspective view of a belt attaching ring for mounting and holding a passive type RFID according to a thirteenth embodiment of the present invention.
Figure 44:
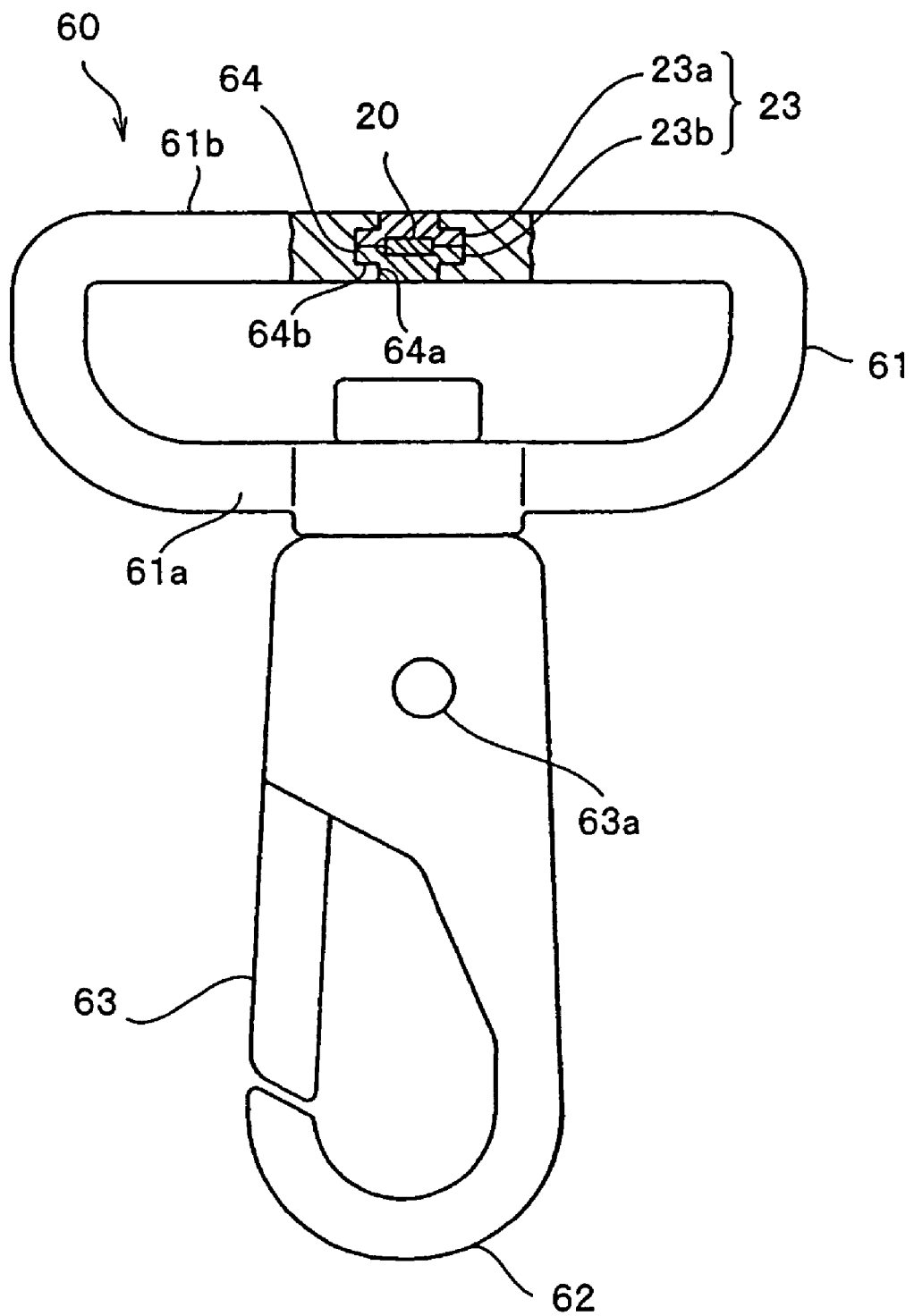
FIG. 44 It is a front view of a swivel for mounting and holding a passive type RFID according to a fourteenth embodiment of the present invention with a part thereof broken.
Figure 45:
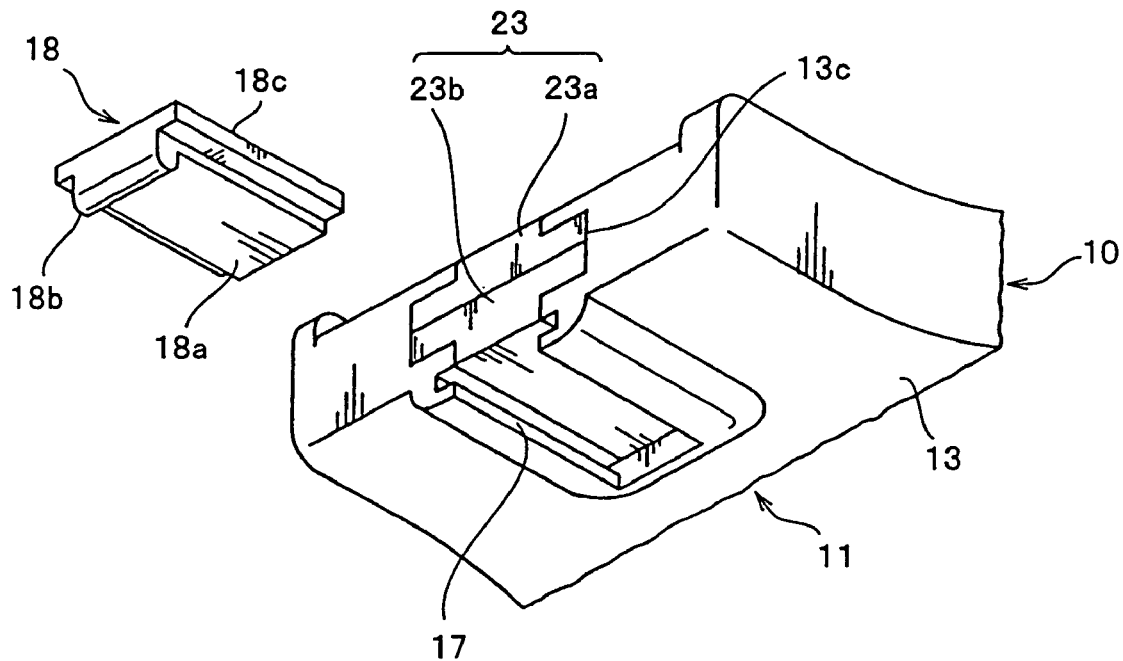
FIG. 45 It is a partial exploded perspective view of a lower plate of a slider for mounting and holding a passive type RFID according to a fifteenth embodiment as seen from downward of its rear mouth side.
Figure 46:
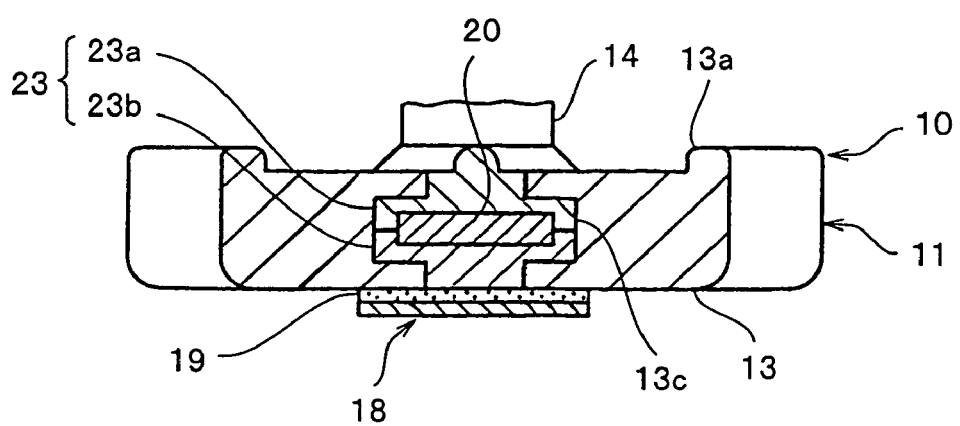
FIG. 46 It is a lateral sectional view including a mounting portion for a passive type RFID according to a modification of the same embodiment.
Figure 47:
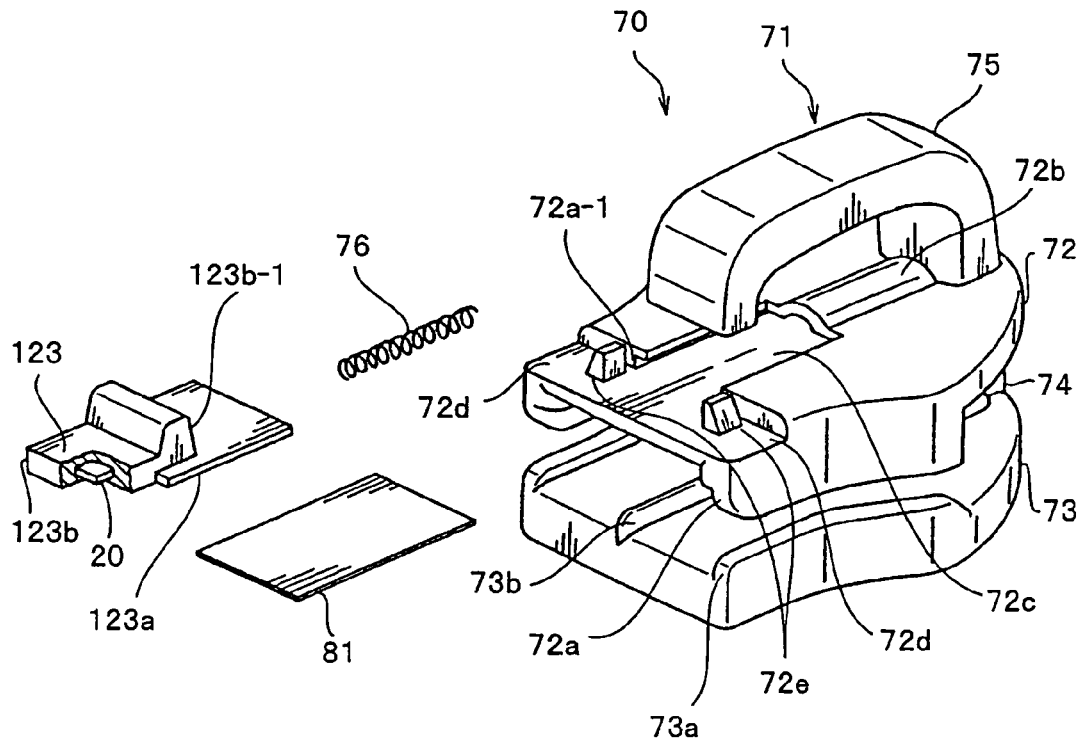
FIG. 47 It is an exploded perspective view of a slider for mounting and holding a passive type RFID according to a sixteenth embodiment of the present invention.
Figure 48:
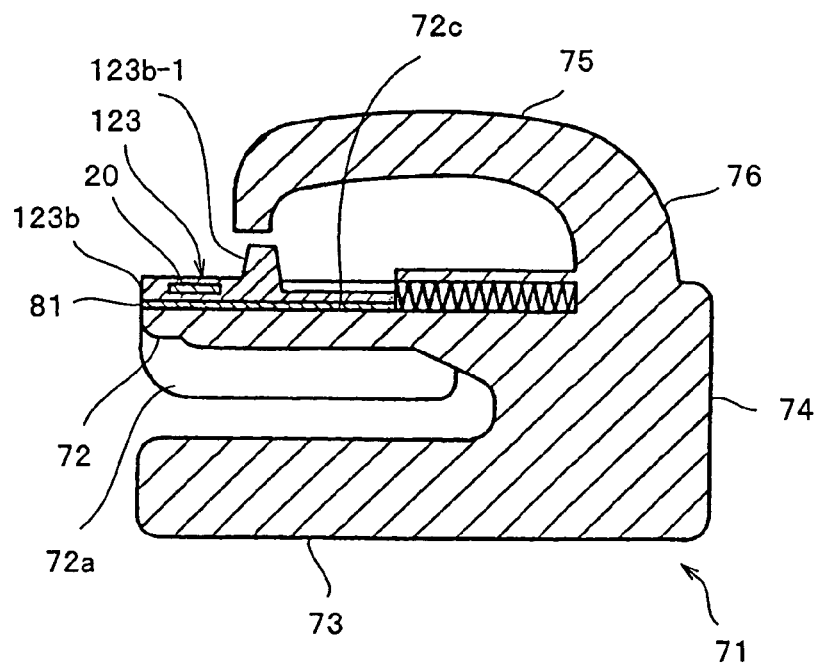
FIG. 48 It is a longitudinal sectional view of the same slider.
Figure 49:
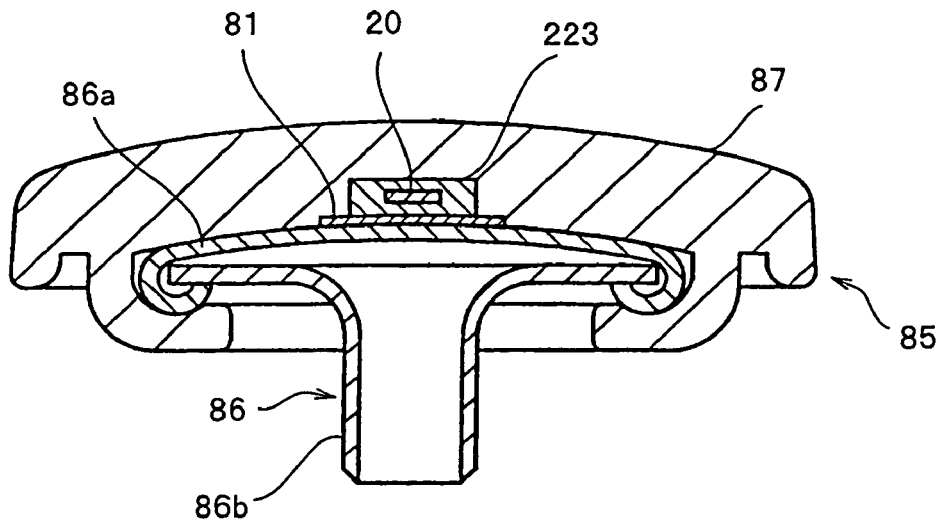
FIG. 49 It is a longitudinal sectional view of a button for mounting and holding a passive type RFID according to a seventeenth embodiment of the present invention.
Figure 50:
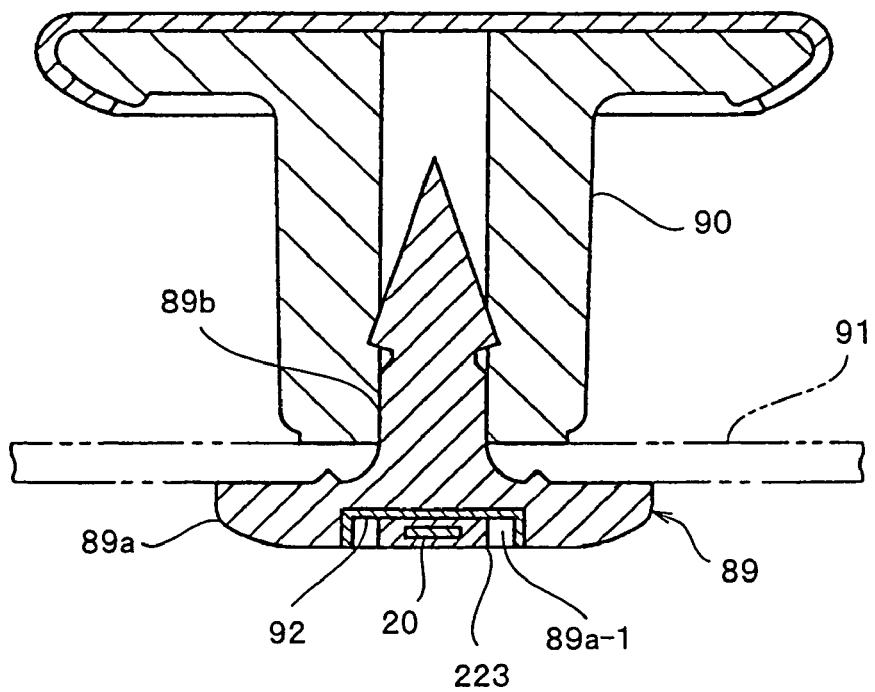
FIG. 50 It is a longitudinal sectional view of a button for mounting and holding a passive type RFID according to an eighteenth embodiment of the present invention.

10: slider
11: slider body
12: upper plate
12*a*: upper flange
12*b*: notch portion
12*b*-1: notch part
12*b*-2: (T-shaped) penetrating part
12*c*: accommodating member fitting groove
12*c*-1: horizontal portion
13: lower plate
13*a*: lower flange
13*b*: lower flange
13*c*: notch portion
13*d*: fitting groove
13*e*: penetrating hole
13*f*: notch
14: connecting post
14*a*: fitting groove
14*a*-1: horizontal groove portion
14*a*-2: vertical groove portion
15: pull tab attaching post
15*a*, 15*b*: front/rear posts
15*c*, 15*d*: first and second fitting grooves
15*e*: penetrating part
15*f*: notch
15*g*: penetrating groove
15*h*: fitting groove
15*i*: penetrating hole
15*j*: horizontal fitting groove
15*k*: ring-like protrusion
15*l*: notch
15*m*: blind hole
15*n*: tight-fitting groove
16: pull tab
16*a*: ring portion
16*b*: rotary shaft portion
16*c*: notch portion
16*d*: circular hole portion
16*e*: notch
17: shielding member fitting groove
18: shielding member
18*a*: rectangular plate piece
18*b*: bent piece
18*c*: thin edge portion
19: adhesive agent layer
20: passive type RFID
23: accommodating member
23*a*, 23*b*: first and second accommodating members
23*a*-1, 23*b*-1: short side portion
23*a*-2, 23*b*-2: long side portion
23*a*-3: penetrating hole
23*a*-4: slit
23*a*-5: frame portion
23*c*, 23*d*: (first and second) accommodating concave portion
23*d*-1: frame portion
23*e*: rib-like protrusion
23*f*: protrusion portion
23*g*: tight-fitting groove
23*h*: horizontal portion
23*i*: vertical portion
24: sealing member
30, 33: button
31: button main body
31*a*: notch portion
32, 34: attaching portion
35: circular base part
35*a*: notch portion
36: covering portion
40: snap button
41: male member
41*a*: circular flange portion
41*b*: projecting portion
42: female member
43: button main body
43*a*: engagement/disengagement hole portion
43*b*: boss portion
44: spring
45: eyelet
45*a*: base part
45*b*: cylindrical attaching portion
46: notch portion
47: covering member
50: belt adjuster
51: rectangular frame body
51*a*: longitudinal lever
51*b*: lateral lever
51*c*: belt attaching lever
52: belt
53: notch portion
53*a*: cut-out face
53*b*: accommodating member fitting groove
55: belt attaching ring
56: notch portion
60: swivel 61: belt attaching ring
61a, 61b: first and second lateral levers
62: hook portion
63: escape preventing piece
63a: pivoting shaft
64: notch portion
64a: cut-out face
64b: accommodating member fitting groove
70: slider
72: upper plate
72a, 73a: flange
72a-1: fitting groove
72b, 73b: rib-like protrusion
72c: leg portion
72d: arm portion
72e: escape preventing protrusion
73: lower plate
74: connecting post
75: pull tab attaching post
76: compression spring
81, 92: electromagnetic shielding member
85: button
86: button main body
86a: circular flange portion
86b: cylindrical attaching portion
87: covering member
89: tack
89a: circular flange portion
89a-1: recess
89b: column portion
90: button main body
91: fabric
100, 200: test piece
101, 201: blind hole
102, 103; 202, 203: upper/lower wall portions
104, 204: penetrating hole
105: notch portion (notch)
123, 223: accommodating member
123a: thin plate portion
123b: step-like block piece
123b-1: upper step portion

The invention claimed is:

1. A fastening article with a wireless IC tag, comprising: a holding part which has first and second surfaces and is made of a high magnetic permeability material, the holding part holding the wireless IC tag mounted with a low magnetic permeability material, and the first surface being opposite and spaced apart from the second surface, wherein
the holding part has a passage which is defined between the first and second surfaces so as to open the first and second surfaces, respectively,
a notch which divides a periphery of the passage along the first surface and the second surface and extends between a part of the first and second surfaces that continue in the periphery of the passage is provided,
a discontinuous region is formed on the holding part in the periphery of the passage due to the notch, and
the wireless IC tag with the low magnetic permeability material is tightly held together in said notch and in said passage.

2. The fastening article with the wireless IC tag according to claim 1, wherein an axis of a magnetic flux accompanied by a carrier emitted to the wireless IC tag and an axis of a magnetic flux generated by an eddy current flowing in the periphery of the passage and the notch, the latter magnetic flux being in an opposite direction to the former magnetic flux, are deflected with respect to the first surface and the second surface.

3. The fastening article with the wireless IC tag according to claim 1, wherein the wireless IC tag is accommodated in an accommodating member formed of a low magnetic permeability material; the accommodating member is composed of a first accommodating member and a second accommodating member; and the first accommodating member and the second accommodating member sandwich the wireless IC tag.

4. The fastening article with the wireless IC tag according to claim 3, wherein the fastening article is a slide fastener, and a holding part of the wireless IC tag is a slider of the slide fastener.

5. The fastening article with the wireless IC tag according to claim 4, wherein the slider has an upper plate, a lower plate, and a connecting post for connecting the upper plate and the lower plate; and the passage and the notch are provided at an edge of the lower plate.

6. The fastening article with the wireless IC tag according to claim 4, wherein the slider has a pull tab and a pull tab attaching post for attaching the pull tab; the pull tab attaching post has a front post and a rear post which are separated to a front and a rear with respect to the slider, and the passage and the notch are provided between opposing end faces of the front post and the rear post.

7. The fastening article with the wireless IC tag according to claim 3, wherein the fastening product is a slide fastener, and a holding part of the IC tag is a pull tab of the slide fastener.

8. The fastening article with the wireless IC tag according to claim 3, wherein the fastening product is a button, and a holding part of the wireless IC tag is a main body of the button.

9. The fastening article with the wireless IC tag according to claim 3, wherein the fastening article is a button; the button has a circular base part and a covering member integrally fixed to a peripheral part of the base part; and the passage and the notch are provided at the peripheral part of the base part.

10. The fastening article with the wireless IC tag according to claim 3, wherein the fastening product is a button, and a holding part of the wireless IC tag is an eyelet of the button.

11. The fastening article with the wireless IC tag according to claim 1 or 2, wherein the wireless IC tag has data for discriminating the real from the false.

12. The fastening article with the wireless IC tag according to claim 1 or 2, wherein the wireless IC tag has data for distribution management.

13. The fastening article with the wireless IC tag according to claim 1, wherein a shielding member made of a high magnetic permeability material for shielding the passage to interrupt communication is attached on a transmitting/receiving face of the holding part made of a high magnetic permeability material with respect to an external reader/writer.

* * * * *